(12) United States Patent
Demmer et al.

(10) Patent No.: US 7,953,869 B2
(45) Date of Patent: *May 31, 2011

(54) COOPERATIVE PROXY AUTO-DISCOVERY AND CONNECTION INTERCEPTION

(75) Inventors: Michael J. Demmer, San Francisco, CA (US); Steven McCanne, Berkeley, CA (US); Alfred Landrum, San Francisco, CA (US)

(73) Assignee: Riverbed Technology, Inc., San Francisco, CA (US)

(*) Notice: Subject to any disclaimer, the term of this patent is extended or adjusted under 35 U.S.C. 154(b) by 179 days.

This patent is subject to a terminal disclaimer.

(21) Appl. No.: 12/391,967

(22) Filed: Feb. 24, 2009

(65) Prior Publication Data

US 2009/0157888 A1 Jun. 18, 2009

Related U.S. Application Data

(63) Continuation of application No. 12/135,114, filed on Jun. 6, 2008, which is a continuation of application No. 10/640,459, filed on Aug. 12, 2003, now Pat. No. 7,650,416.

(51) Int. Cl.
*G06F 15/16* (2006.01)
(52) U.S. Cl. ........................ 709/228; 709/229; 709/230
(58) Field of Classification Search .................. 709/227, 709/228, 229, 230
See application file for complete search history.

(56) References Cited

U.S. PATENT DOCUMENTS 5,737,594 A 4/1998 Williams
(Continued)

FOREIGN PATENT DOCUMENTS

JP 2002359649 A 12/2002
(Continued)

OTHER PUBLICATIONS

Amer et al., "File Access Prediction with Adjustable Accuracy," *Proceedings of the Performance, Computing, and Communications Conference 2002 on 21st IEEE International*, 2002, pp. 131-140, IEEE Computer Society, Washington D.C., USA.

(Continued)

*Primary Examiner* — Patrice L Winder
*Assistant Examiner* — Hieu Hoang
(74) *Attorney, Agent, or Firm* — Philip H. Albert; Kilparrick Townsend & Stockton, LLP

(57) ABSTRACT

In a network supporting transactions between clients and servers and proxies that are interposable in a network path between at least one client and at least one server, wherein a pair of proxies can modify a packet stream between a client and a server such that packet data from the client to the server is transformed at a client-side proxy of the proxy pair and untransformed at a server-side proxy of proxy pair and such that packet data from the server to the client is transformed at the server-side proxy and untransformed at the client-side proxy, a method and apparatus for a discovering proxy to transparently discover its position in a proxy pair by using proxy signals to indicate to other proxies that could pair with the discovering proxy. A discovering proxy might determine that it is a client-side proxy by receipt of a packet from client without a proxy signal. A discovering proxy might determine that it is a server-side proxy by receipt of a packet from server without a return proxy signal. Once a proxy pair is discovered, that proxy pair might transform traffic from the server to the client or vice versa, transforming the traffic at one proxy of the proxy pair and untransforming the traffic at the other proxy of the pair.

9 Claims, 21 Drawing Sheets

U.S. PATENT DOCUMENTS

| | | | |
|---|---|---|---|
| 5,754,774 A | 5/1998 | Bittinger et al. | |
| 5,822,746 A | 10/1998 | Williams | |
| 5,941,988 A * | 8/1999 | Bhagwat et al. | 726/12 |
| 5,990,810 A | 11/1999 | Williams | |
| 6,138,162 A | 10/2000 | Pistriotto et al. | |
| 6,163,811 A | 12/2000 | Porter | |
| 6,178,461 B1 | 1/2001 | Chan et al. | |
| 6,311,216 B1 * | 10/2001 | Smith et al. | 709/226 |
| 6,347,342 B1 * | 2/2002 | Marcos et al. | 719/315 |
| 6,397,253 B1 | 5/2002 | Quinlan et al. | |
| 6,415,323 B1 | 7/2002 | McCanne et al. | |
| 6,415,329 B1 | 7/2002 | Gelman et al. | |
| 6,449,658 B1 | 9/2002 | Lafe et al. | |
| 6,473,406 B1 | 10/2002 | Coile et al. | |
| 6,487,538 B1 | 11/2002 | Gupta et al. | |
| 6,553,141 B1 | 4/2003 | Huffman | |
| 6,598,081 B1 | 7/2003 | Coile et al. | |
| 6,642,860 B2 | 11/2003 | Meulenbroeks | |
| 6,667,700 B1 | 12/2003 | McCanne et al. | |
| 6,678,828 B1 | 1/2004 | Pham et al. | |
| 6,704,730 B2 | 3/2004 | Moulton et al. | |
| 6,721,780 B1 | 4/2004 | Kasriel et al. | |
| 6,757,733 B2 | 6/2004 | Gupta | |
| 6,772,193 B1 | 8/2004 | Igawa et al. | |
| 6,822,955 B1 | 11/2004 | Brothers et al. | |
| 6,874,017 B1 | 3/2005 | Inoue et al. | |
| 6,892,235 B1 * | 5/2005 | Daude et al. | 709/224 |
| 6,894,981 B1 | 5/2005 | Coile et al. | |
| 6,940,835 B2 * | 9/2005 | Reza et al. | 370/331 |
| 6,973,485 B2 | 12/2005 | Ebata et al. | |
| 6,981,029 B1 | 12/2005 | Menditto et al. | |
| 7,016,973 B1 * | 3/2006 | Sibal et al. | 709/238 |
| 7,047,485 B1 | 5/2006 | Klein et al. | |
| 7,120,666 B2 | 10/2006 | McCanne et al. | |
| 7,123,613 B1 * | 10/2006 | Chawla et al. | 370/389 |
| 7,161,947 B1 | 1/2007 | Desai | |
| 7,162,529 B2 * | 1/2007 | Morishige et al. | 709/230 |
| 7,316,028 B2 | 1/2008 | Donatelli et al. | |
| 7,318,100 B2 | 1/2008 | Demmer et al. | |
| 7,610,393 B1 * | 10/2009 | Chen et al. | 709/230 |
| 7,650,416 B2 | 1/2010 | Wu et al. | |
| 2001/0051927 A1 | 12/2001 | London et al. | |
| 2002/0038371 A1 | 3/2002 | Spacey | |
| 2002/0062384 A1 | 5/2002 | Tso | |
| 2002/0087547 A1 | 7/2002 | Kausik et al. | |
| 2002/0091801 A1 | 7/2002 | Lewin et al. | |
| 2002/0138511 A1 | 9/2002 | Psounis et al. | |
| 2002/0156911 A1 | 10/2002 | Croman et al. | |
| 2002/0157019 A1 | 10/2002 | Kadyk et al. | |
| 2002/0161904 A1 * | 10/2002 | Tredoux et al. | 709/229 |
| 2002/0194382 A1 | 12/2002 | Kausik et al. | |
| 2003/0043844 A1 | 3/2003 | Heller | |
| 2003/0055826 A1 | 3/2003 | Graham | |
| 2003/0065711 A1 * | 4/2003 | Acharya et al. | 709/203 |
| 2003/0115488 A1 * | 6/2003 | Kunito et al. | 713/201 |
| 2003/0163646 A1 | 8/2003 | O'Neil | |
| 2003/0217151 A1 * | 11/2003 | Roese et al. | 709/225 |
| 2003/0225889 A1 * | 12/2003 | Moutafov | 709/227 |
| 2004/0128393 A1 * | 7/2004 | Blakley et al. | 709/229 |
| 2004/0215746 A1 | 10/2004 | McCanne et al. | |
| 2008/0320154 A1 | 12/2008 | Demmer et al. | |

FOREIGN PATENT DOCUMENTS

| | | |
|---|---|---|
| JP | 2004254039 A | 9/2004 |
| WO | WO 95/20793 A | 8/1995 |
| WO | WO 00/13110 A | 3/2000 |
| WO | WO 01/80022 A | 10/2001 |
| WO | WO 02/054699 A | 7/2002 |

OTHER PUBLICATIONS

Caceres et al., "Web Proxy Caching: The Devil Is In The Details," *Proceedings of the Workshop on Internet Server Performance*, Jun. 1998, pp. 111-118, Scientific Literature Digital Library, Madison, Wisconsin, USA.

Deshpande et al., "Selective Markov Models for Predicting Web-Page Accesses," *ACM Transactions on Internet Technology*, 2004, pp. 163-184, vol. 4, Issue 2.

Factor et al., "Compression in the Presence of Shared Data," *Internetional Journal of Computing and Information Sciences*, Jun. 2001, pp. 29-41, vol. 135, Issue 1-2.

Fan et al., "Summary Cache: A Scalable Wide Area Web Cache Sharing Protocol," *Proceedings of the IEEE/ACM Transactions on Networking*, Jun. 2000, vol. 8, No. 3, pp. 281-293.

Feldmeier et al., "Protocol Boosters," IEEE JSAC, Apr. 1998, pp. 437-444, vol. 16, Issue 3.

Griffoen et al., "Automatic Prefetching in a WAN," *Proceedings of the IEEE Workshop on Advances in Parallel and Dustributed Systems*, Oct. 1993,Technical Report#CS243-93, pp. 8-12.

Griffoen et al., "Reducing File System Latency Using a Predictive Approach," *Proceedings of the USENIX Summer 1994 Technical Conference on USENIX*, Jun. 1994, vol. 1.

Housel et al., "Emulator Express: A System for Optimizing Emulator Performance for Wireless Networks," *IBM Systems Journal*, 2000, pp. 384-402, vol. 39, Issue 2.

Kahol et al., "A Strategy to Manage Cache Consistency in a Disconnected Distributed Network," *IEEE. Transactions on Parallel and Distributed Systems*, Jul. 2001, pp. 686-700, vol. 12, Issue 7, IEEE Computer Society. Los Alamitos, California, USA.

Knutsson et al., "Transparent Proxy Signalling," *Journal of Communications and Networks*, 2001, pp. 164-174, vol. 3, No. 2, Korean Institute of Communication Sciences, Seoul, Korea.

Lei et al., "An Analytical Approach to File Prefetching," *Proceedings of the Annual Conference on USENIX Annual Technical Conference*, Jan. 1997, pp. 1-12, Anaheim, California, USA.

Mellia et al., "TCP Smart-Framing: Using Smart Segments to Enhance the Performance of TCP," *IEEE*, 2001, pp. 1708-1712.

Muthitacharoen et al., "A Low-bandwidth Network File System," *Proceedings of the 18th ACM Symposium on Operating System Principles (SOSP'01)*, Oct. 21-24, 2001, pp. 174-187.

Oly et al., "Markov Model Prediction of I/0 Requests for Scientific Applications," *Proceedings of the 16th International Conference on Supercomputing*, Jun. 2002, pp. 147-155.

Rhea et al., "Value-Based Web Caching," *Proceedings of the 12th International Conference on World Wide Web*, Budapest, Hungary, May 2003, pp. 619-628, ACM, New York, New York, USA.

Spring et al., "A Protocol-Independent Technique for Eliminating Redundant Network Traffic" *Proceedings of ACM SIGCOMM,Computer Communication Review*, Oct. 2000, pp. 87-95, vol. 30, Issue 4.

Tolia et al., "An Architecture for Internet Data Transfer," *Third Symposium on Networked Systems Design and Implementation (NSDI'06)*, May 2006, San Jose, California, USA.

"Unleashing the True Power of Today's Networks," *A Peribit White Paper*, Aug. 2002, pp. 1-13, URL=http://www.peribit.com/products/etc/0217w02punl.htm.

Yang et al., "Mining Web Logs for Prediction Models in WWW Caching and Prefetching," *Proceedings of the Seventh ACM SIGKDD International Conference on Knowledge Discovery and Data Mining KDD'01*, Aug. 2001, pp. 473-478, San Francisco, California, USA.

Padmanabhan, et al. "*Using predictive pretetching to improve World Wide Web latency*" ACM SIGCOMM Computer Communication Review, Jul. 1999, pp. 22-36, vol. 26, No. 3.

* cited by examiner

COOPERATIVE PROXY AUTO-DISCOVERY AND CONNECTION INTERCEPTION

CROSS-REFERENCES TO RELATED APPLICATIONS

This application is a continuation of co-pending Nonprovisional patent application Ser. No. 12/135,114 filed Jun. 6, 2008 which is a continuation of Nonprovisional patent application Ser. No. 10/640,459 filed Aug. 12, 2003 entitled "Content Delivery for Client-Server Protocols With User Affinities Using Connection End-Point Proxies," incorporating by reference U.S. patent application Ser. No. 10/640,562, also filed Aug. 12, 2003 entitled Cooperative Proxy Auto-Discovery and Connection Interception.

The present disclosure is related to the following commonly assigned co-pending U.S. patent applications or U.S. patents, which are each incorporated by reference herein for all purposes:

U.S. patent application Ser. No. 10/285,315 entitled "Transaction Accelerator for Client-Server Communication Systems" (hereinafter "McCanne I") filed on Oct. 30, 2002 now U.S. Pat. No. 7,120,666 B2 issued Oct. 10, 2006; U.S. patent application Ser. No. 10/285,330 entitled "Content-Based Segmentation Scheme for Data Compression in Storage and Transmission Including Hierarchical Segment Representation" (hereinafter "McCanne II") filed on Oct. 30, 2002 now U.S. Pat. No. 6,667,700 issued Dec. 23, 2003;

U.S. patent application Ser. No. 10/640,405 entitled "Transparent Client-Server Transaction Accelerator" (hereinafter "McCanne III") filed on Aug. 12, 2003, now U.S. Publication No. 2004/0215746 published Oct. 28, 2004; and U.S. patent application Ser. No. 10/640,562 entitled "Cooperative Proxy Auto-Discovery and Connection Interception" (hereinafter "McCanne IV") filed on Aug. 12, 2003, now U.S. Pat. No. 7,318,100 issued Jan. 8, 2008.

FIELD OF THE INVENTION

The present invention relates generally to data transport over networks and proxies, and more specifically to establishing communication between and through proxy agents in a data network.

BACKGROUND OF THE INVENTION

A network is typically used for data transport among devices at network nodes distributed over the network. Some networks are considered "local area networks" (LANs), others are considered "wide area networks" (WANs), although not all networks are so categorized and others might have both LAN and WAN characteristics. Often, a LAN comprises nodes that are all controlled by a single organization and connected over dedicated, relatively reliable and physically short connections. An example might be a network in an office building for one company or division. By contrast, often a WAN comprises nodes that might include nodes over which many different organization's data flow, and might involve physically long connections. In one example, a LAN might be coupled to a global internetwork of networks referred to as the "Internet" such that traffic from one node on the LAN passes through the Internet to a remote LAN and then to a node on that remote LAN.

Data transport is often organized into "transactions", wherein a device at one network node initiates a request for data from another device at another network node and the first device receives the data in a response from the other device. By convention, the initiator of a transaction is referred to herein as the "client" and the responder to the request from the client is referred to herein as the "server".

Notably, in some instances, what is normally thought of as the client is in fact the server, as with the example of a window system referred to as "X". In some instances, a device, program, or other computing entity can be a client for some transactions and a server for others. For example, suppose device A and device B are coupled by a network and device A makes a request for data of device B. For that transaction, device A is the client and device B is the server. Now, if device B only responds to authorized requests, device B might make a request of device A for authentication data. Thus, for the authentication transaction, device B would be the client and device A would be the server, the reverse of the roles for the data request transaction.

As explained above, a transaction over a network involves bidirectional communication between two computing entities, where one entity is the client and initiates a transaction by opening a network channel to another entity (the server). Typically, the client sends a request or set of requests via a set of networking protocols over that network channel, and the request or requests are processed by the server, returning responses. Many protocols are connection-based, whereby the two cooperating entities (sometimes known as "hosts") negotiate a communication session to begin the information exchange. In setting up a communication session, the client and the server might each maintain state information for the session, which may include information about the capabilities of each other. At some level, the session forms what is logically (or physically, in some cases) considered a "connection" between the client and server. Once the connection is established, communication between the client and server can proceed using state from the session establishment and other information and send messages between the client and the server, wherein a message is a data set comprising a plurality of bits in a sequence, possibly packaged as one or more packets according to an underlying network protocol. Typically, once the client and the server agree that the session is over, each side disposes of the state information for that transaction, other than possibly saving log information.

To realize a networking transaction, computing hosts make use of a set of networking protocols for exchanging information between the two computing hosts. Many networking protocols have been designed and deployed, with varying characteristics and capabilities. The Internet Protocol (IP), Transmission Control Protocol (TCP), and User Datagram Protocol (UDP) are three examples of protocols that are in common use today. Various other networking protocols might also be used.

Since protocols evolve over time, a common design goal is to allow for future modifications and enhancements of the protocol to be deployed in some entities, while still allowing those entities to interoperate with hosts that are not enabled to handle the new modifications. One simple approach to accomplishing interoperability is a protocol version negotiation. In an example of a protocol version negotiation, one entity informs the other entity of the capabilities that the first entity embodies. The other entity can respond with the capabilities that the other entity embodies. Through this negotiation, each side can be made aware of the capabilities of the other, and the channel communication can proceed with this shared knowledge. To be effective, this method must ensure that if one entity advertises a capability that the other entity does not understand, the second entity should still be able to handle the connection. This method is used in both the IP and TCP protocols—each provides a mechanism by which a variable length set of options can be conveyed in a message. The specification for each protocol dictates that if one entity does not have support for a given option, it should ignore that option when processing the message. Other protocols may have a similar features that allow for messages to contain data that is understood by some receivers of the data but possibly not understood by other receivers of the data, wherein a receiver that does not understand the data will not fail in its task and will typically forward on the not understood data such that another entity in the path will receive that data.

A message from a client to a server or vice-versa traverses one or more network "paths" connecting the client and server. A basic path would be a physical cable connecting the two hosts. More typically, a path involves a number of physical communication links and a number of intermediate devices (e.g., routers) that are able to transmit a packet along a correct path to the server, and transmit the response packets from the server back to the client. These intermediate devices typically do not modify the contents of a data packet; they simply pass the packet on in a correct direction. However, it is possible that a device that is in the network path between a client and a server could modify a data packet along the way. To avoid violating the semantics of the networking protocols, any such modifications should not alter how the packet is eventually processed by the destination host.

While routing protocols generally control how packets are forwarded through a network, sometimes it is desirable to control the forwarding of an individual packet according to rules that override the normal packet routing logic. A common mechanism for accomplishing this is via a set of packet filtering rules. These rules specify characteristics of individual packets and a desired action or actions to take on each individual packet that meets the characteristics. For example, a firewall employs certain packet filters to dictate that some packets should be forwarded, while other packets should be rejected.

Another mechanism that affects the forwarding of an individual packet and overrides the normal packet routing logic is network address translation (NAT). Using NAT, an entity that receives packets modifies the packet's destination and/or source address before passing on the packet. NAT is commonly used at the border between one network of hosts and another network of hosts (or the Internet as a whole). A router or other such device deployed at the border is configured with a set of rules indicating which packets should have the NAT operation applied, though this may in practice end up being all packets that traverse the device. In this scenario, a set of hosts can be configured with a private range of IP addresses that is not exposed to other hosts in the network—rather the border router rewrites the source address of outgoing packets from the original host's private address to one of a given set of public addresses. This way, the destination server does not need to have routing information to reach the private address, since it perceives all connections as coming from the public address. The router maintains state such that for response packets coming back from the server (addressed to the public destination address), it rewrites the destination and forwards the packet to the original private address, thus routing the packet back to the original client host.

NAT is also used by Layer 4 switch devices ("L4 switches"). An L4 switch is a device that is deployed in the network path that can route all the packets for a particular connection to a destination that differs from the original destination field of each packet in the connection. A common deployment of L4 switches is for use in load balancing. In this type of deployment, a set of servers (each having distinct addresses) is deployed to share the load from client requests such that a connection from a client to a particular server (often called a virtual server) can be routed to and terminated by any server in the set. Rather than rely on the client to choose one of the given servers, an L4 switch is deployed in the network path between the clients and this set of servers. The switch examines the packets and, based on its configuration, uses NAT to forward all packets from a particular client-server connection to a particular server in the set, and conversely, forward all packets from that particular server to the client such that, to the client, the packets appear to come from the virtual server.

Another related concept is that of a network proxy. A network proxy is a transport-level or application-level entity that functions as a performance-enhancing intermediary between the client and the server. In this case, a proxy is the terminus for the client connection and initiates another connection to the server on behalf of the client. Alternatively, the proxy connects to one or more other proxies that in turn connect to the server. Each proxy may forward, modify, or otherwise transform the transactions as they flow from the client to the server and vice versa. Examples of proxies include (1) Web proxies that enhance performance through caching or enhance security by controlling access to servers, (2) mail relays that forward mail from a client to another mail server, (3) DNS relays that cache DNS name resolutions, and so forth.

One problem that must be overcome when deploying proxies is that of directing client requests to the proxy instead of to the destination server. One mechanism for accomplishing this is to configure each client host or process with the network address information of the proxy. This requires that the client application have an explicit proxy capability, whereby the client can be configured to direct requests to the proxy instead of to the server. In addition, this type of deployment requires that all clients must be explicitly configured and that can be an administrative burden on a network administrator.

One way around the problems of explicit proxy configuration is to deploy a transparent proxy. The presence of the transparent proxy is not made explicitly known to the client process, so all client requests proceed along the network path towards the server as they would have if there were no transparent proxy. This might be done by placing the transparent proxy host in the network path between the client and the server. An L4 switch is then employed so the proxy host can intercept client connections and handle the requests via the proxy. For example, the L4 switch could be configured so that all Web connections (i.e., TCP connections on port 80) are routed to a local proxy process. The local proxy process can then perform operations on behalf of the server. For example, the local proxy process could respond to the request using information from its local cache. When intercepting the connection, the L4 switch performs NAT so the connection appears to the client as having been terminated at the origin server, even though the client communicates directly with the proxy. In this manner, the benefits of a proxy can be realized without the need for explicit client configuration.

Some benefits of a transparent proxy require that a proxy pair exist in the network path. For example, if a proxy is used to transform data in some way, a second proxy preferably untransforms the data. For example, where traffic between a client and a server is to be compressed or encrypted for transport over a portion of the network path between the client and the server, a proxy on one side of that portion would compress or encrypt data before it flows over that portion and a proxy on the other side of that portion would uncompress or decrypt the data and send it along the network path, thereby providing for transparent transformation of data flowing between the client and the server.

For actions that require a proxy pair, preferably both proxies in the proxy pair do not perform a transformation unless they can be assured of the existence and operation of the other proxy in the proxy pair. Where each proxy must be explicitly configured with indications of the pairs to which it belongs and to the identity of the other members of those pairs, the administrative burden on a network administrator might well make some operations infeasible if they require proxy pairs. Even where a proxy is interposed in a network and gets all of the traffic from a client or server, it still must discover the other member for each proxy pair the proxy needs, if the proxy is to perform actions that require proxy pairs.

Users will often need to run applications that are designed with acceptable performance for a particular network configuration, but have to run those applications over a network configuration that has a much lower performance. As a common example is a LAN-based application that must accommodate a WAN, that example is used herein in several places.

Several approaches to overcoming the network performance for the lower performance network that is to handle data for applications designed with higher performance networks in mind. However, most solutions are unsatisfactory in one way or another.

One approach is to replicate servers and deploy systems that automatically mirror or replicate data from origin servers in data centers to replicated servers in distributed locations to, in effect, move copies of the data closer to clients. The replicated servers would then have copies (a mirror) of the data from the origin server, but the replicated servers would be closed to the clients they server than the origin server. Clients would access data from their local replicated server to achieve better performance, since the data would be "closer" in a network sense. This approach suffers from the complexity and expense of deploying duplicate servers and managing the flow and synchronization of data from the origin servers to the replicated servers. With this approach, it is in difficult to predict what data is needed where and when, so the implementation often just duplicates all available data in each location.

Another approach that has been used with Web content and streaming media is to deploy proxy cache devices at distributed locations to enhance the access performance to data that is retrieved at a given location more than once. In such an arrangement with LANs/WANs, caching proxies are situated on LANs near clients. A caching proxy would act as an intermediary between its set of clients and servers that are accessed across a WAN. A caching proxy stores previously transmitted data in the hope that the cached data will be requested sometime in the future. When a client requests data from a Web server, for example, that client's Web connection is intercepted by the proxy cache. If the proxy cache has the requested data, it simply serves the data locally across the LAN. If it does not have the requested data, it retrieves the requested data from the server across the WAN, transmits the data to the requesting client, and stores the retrieved data in its cache, indexed by its uniform resource locator (URL) in hopes that it would be reused for a later request.

In this fashion, data accessed multiple times suffers the performance bottleneck of the WAN only on the first client request, then enjoys the performance benefit of the LAN for all subsequent accesses. However, for data that is only accessed once, there is no performance benefit. Other techniques are used to improve performance for the first client request for data (that is subsequently requested again or is only requested once). For example, network caching systems have been augmented with content delivery capabilities whereby operators can move desired content into the proxy caches before it is requested. In this model, a content publishing system usually interfaces with a content delivery system to allow an operator to publish content to the set of proxy caching servers. Thus, presuming a certain piece of data has been pre-loaded into a proxy cache in this fashion, the first client request for that data will experience high performance. However, such systems are generally complex to create and administer, and often require new business process to be deployed to support this mode of information delivery. Also, relying upon user configuration to place content appropriately is generally expensive, sub-optimal, and prone to error.

Therefore, improved techniques for handling data over networks are needed.

BRIEF SUMMARY OF THE INVENTION

In a network supporting transactions between clients and servers and proxies that are interposable in a network path between at least one client and at least one server, wherein a pair of proxies can modify a packet stream between a client and a server such that packet data from the client to the server is transformed at a client-side proxy of the proxy pair and untransformed at a server-side proxy of proxy pair and such that packet data from the server to the client is transformed at the server-side proxy and untransformed at the client-side proxy, a method and apparatus for a discovering proxy to transparently discover its position in a proxy pair by using proxy signals to indicate to other proxies that could pair with the discovering proxy. A discovering proxy might determine that it is a client-side proxy by receipt of a packet from client without a proxy signal. A discovering proxy might determine that it is a server-side proxy by receipt of a packet from server without a return proxy signal. Once a proxy pair is discovered, that proxy pair might transform traffic from the server to the client or vice versa, transforming the traffic at one proxy of the proxy pair and untransforming the traffic at the other proxy of the pair.

In some variations, more than two proxies along a network path between a client and a server cooperate to transparently intercept and proxy network transactions. Once proxies discover each other, they can transparently intercept network transactions. Various actions might be taken as part of the interception, such as optimize the network transaction. One such optimization is to use the proxy pair to reduce bandwidth usage and apparent network latency. One approach to reducing bandwidth usage is to use segment cloning between pairs of proxies that span a limited bandwidth network portion. One approach to reducing latency is to predict transactions and generate synthetic requests at a proxy such that portions of a transaction occur and might be transported prior to a client making the request.

In yet other variations, a single proxy can be used between a client and server to intercept connections and do so transparently. One method for a transparent interception is to use the client address when connecting to the server and use the server address when connecting to the client. A pair of transparent proxies might be used to optimize a network transaction, wherein each transparent proxy can communicate with the other using their actual network addresses, but using the client address for connecting to the server and the server address when connecting to the client.

Other features and advantages of the invention will be apparent in view of the following detailed description and preferred embodiments.

DETAILED DESCRIPTION OF THE INVENTION

Figure 1:
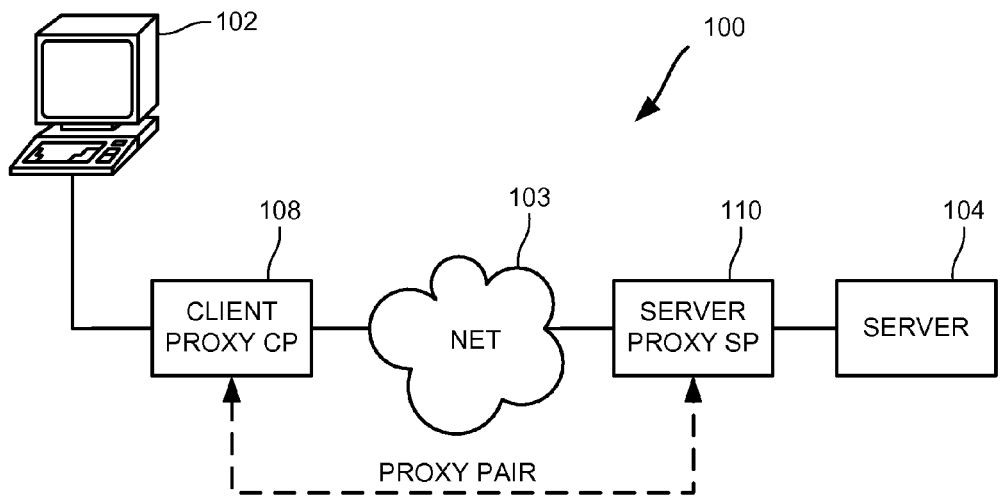
FIG. 1 is a block diagram of a networked system where a client-side proxy and a server-side proxy are interposed in a network path between a client and a server.

The present invention has many applications, as will be apparent after reading this disclosure. In describing an embodiment of a networked content delivery system according to the present invention, only a few of the possible variations are described. Other applications and variations will be apparent to one of ordinary skill in the art, so the invention should not be construed as narrowly as the examples, but rather in accordance with the appended claims.

A transaction, as the term is used herein, is a logical set of steps that result in data moving from one place to another. In some cases, the data being moved exists at its origin independent of the transaction, such as a file read transaction where the file exists on the disk of the server. In other cases, the data is generated for the transaction at the origin, such as in response to a request for computation, lookup, etc. Typically, the computer, computer device, etc., initiating the transaction is referred to as the "client" and the computer, computer device, etc., that responds, or is expected to respond, is referred to as the "server".

Data can flow in either direction. For example, a file system client might initiate a transaction by requesting a file read from a file server. The corresponding data will be returned from the server responding to the request, so in that case, the bulk of the data flows from the server to the client. However, where a client initiates a file write transaction, the bulk of the data flows from the client to the server, either as part of the initial request or as subsequent messages.

A transaction can be in multiple parts, but in a simple transaction, a client sends a request (data, a message, a signal, etc., explicitly being the request or indicative of, or representing, the request) to a server and the server responds with a response (data, a message, a signal, etc., explicitly being the response or indicative of, or representing, the response) to the client. More complex transactions, for example, might involve some back and forth, as might be needed for a server to clarify a request, verify the authority of the client to receive a response to the request, get additional information needed for preparing the response, etc.

Herein, the typical example of a connection between a client and a server is a packet network, but other connection means can also be used, such as a point-to-point wired or wireless channel. These elements will be generalized and referred to herein as "nodes" with a channel assumed for communication between the nodes.

A transaction might begin with a client at one node making a request for file data directed to a server at another node, followed by a delivery of a response containing the requested file data. Other transactions might be a request for a specific part of a file, the entire file, all or some of another data construct, or a transaction might relate to data flowing from the requester or relate to a command. Examples of transactions include "read a block", "read a file", "read a stream", "write a block with this data" (an example of data flowing from the requestor), "open a file", "perform a calculation on this data", "get an e-mail with these characteristics", "send an e-mail", "check for new e-mails", "list directory contents", etc.

Some transactions might involve large amounts of data flowing in one direction or both directions. Some transactions might even involve interactions having more than one requester and/or more than one receiver. For clarity of description, these many transaction types are described in terms of a typical simple transaction, where one client makes a request of one server and that one server responds to the request in a manner expected by the client. However, upon reading this disclosure, a person of ordinary skill will be able to apply these concepts to one-to-many and many-to-many transactions between client(s) and server(s) or more generally between two nodes. Where data flow is described in one direction, it should be understood that data might flow in the other direction and/or information might flow in only one direction, but data and/or signals flow in both directions to accomplish the movement of information.

As used herein, "near" may refer to physical proximity, but can also refer to network proximity. Network proximity relates to performance attributes. As an example, two nodes of a LAN might be considered more near than two nodes separated by a slow network channel. Often is the case that large physical distances do not result in network proximity, but there are examples where two nodes can be physically close but faraway in network terms and where two nodes can be physically far away but relatively close in network terms.

A general problem when deploying multiple network entities in a cooperative scenario, in which the devices must coordinate and interact with one another, is that of configuration. This problem is especially acute when trying to deploy cooperative transparent proxy functionality that depends on several cooperating network entities, such as where network traffic between a client and a server is to be intercepted by one proxy that in turn communicates with one or more other proxies to process the network traffic. In general, the proxies may modify or otherwise process the client-server traffic using techniques that are incompatible with the original client-server protocol and thus require a proxy at some point to process the data back to a form that is compatible with the original client-server protocol. The conversion of the data back into the compatible form could be a conversion packet to data identical to what was converted, but need not be identical so long as protocol requirements are met.

Devices such as L4 switches can intercept network traffic without explicit client and/or server configuration, but that approach cannot accommodate proxy pairs, where an intercepting device pairs with another intercepting device such that the first device transforms the data and the second device untransforms the data to reconstitute exactly what the first device received or to generate data that is not exactly what the first device received but is in conformance with the protocol. For example, transformation might include the removal of extraneous data and further transformation, while the untransformation does not add back the extraneous data but does an inverse of the further transformation. In such a scenario, a given proxy must still be aware of the existence and network address information of the other cooperating proxies. For example, in a system where two proxies are performing a transport layer compression operation such as the segment cloning described in McCanne I, the two proxies that form a proxy pair need to be aware that there is a corresponding proxy also in the network path to perform the compression operation.

As used herein, "proxy pairing" is a process of associating two proxies. The two proxies are members of a proxy pair and each member of a proxy pair is aware of the other member of the proxy pair and knows its address (or other identifier). A given proxy can be a member of more than one proxy pair. Where a given proxy is a member of a plurality of proxy pairs, the other members of those proxy pairs can be distinct or can be duplicative, i.e., there might be more than one proxy pair that has the same two members. In some cases, a proxy pair might be generalized to a "proxy grouping" of more than two proxies for purposes equivalent to what a proxy pair might do.

Generally, a proxy pair exists in relation to one or more transactions. Thus, proxy A and proxy B might be paired for some transactions and not others. Often, two proxies are paired for all transactions between pairs of particular clients and particular servers. In most instances, a proxy pair comprises a client-side proxy ("CP") and a server-side proxy ("SP") and each member of the proxy pair is aware of which side (client or server) they are on.

The proxies in a proxy pair can become aware of the pair and the other member (and which side they are on) by being explicitly configured as a proxy in a proxy pair, the proxies can become aware based on information provided by a client or a server (which typically requires an appropriately configured client or server), or the proxies can automatically discover possible proxy pairs using techniques described herein. Naturally, if proxies can discover proxy pairs of which they are members without any assistance from a client, a server or a network configurator, in a way that such discovery can have been transparent to clients and servers, operation and maintenance of a proxy pairing system is greatly simplified.

Once the proxies in a proxy pair are aware of the pairing and the other member, the pair can intercept network transactions. Once intercepted, such proxies are able to implement performance-enhancing optimizations to both the transport protocol as well as the application data payloads in a transparent fashion and thus remain backward compatible with existing deployments of clients and servers. With the pairing, the optimizations need not conform to the end-to-end network protocol, as each proxy can undo nonconforming operations of the other proxy.

Connection interception can be done by a number of different devices, which might involve hardware, software, or both. Interception can be done with a computer, computing device, peripheral, electronics, or the like, and/or using an application being executed or controlled by such element. The interception mechanism can be integrated into a network device such as a router or a bridge, such that some of the traffic that flows through the device is altered by the interception mechanism. The interception mechanism may alternatively be integrated into the client and/or the server itself. Thus, when describing herein a client-side proxy and/or server-side proxy, those terms need not necessarily refer to separate physical hosts or computing entities, but may be logical entities that are part of the client, the server, and/or any other routers, devices or hosts along the network path between the client and server.

The general term "proxy device" is used to refer to a proxy that could be a client-side proxy, a server-side proxy, or both (client-side proxy for some pairs/transactions, server-side proxy for other pairs/transactions). The functionality described herein as the CP and the functionality described herein as the SP can exist in one proxy device, such that the proxy device functions as both an SP and a CP, simultaneously, for different client-server connections.

It should be understood that while clients, servers and proxy devices are shown herein in various places as stand-alone boxes, clients, servers and proxies can be implemented as discrete hardware elements, software elements running on a programmable computing element (desktop computer, handheld device, router, switch, embedded logic device, etc.), firmware, or some combination, running as distinct elements or integrated with other elements. For example, a router might include software to implement a proxy device ("PD") that might be a CP or an SP for some transactions, with that CP or SP functionality entirely implemented as part of the router.

FIG. 1 illustrates a simple example of a networking configuration wherein a proxy pair is interposed in a network path between a client and a server. As shown there, system 100 can be used for communications between a client 102 and a server 104 across a network 103. In a number of examples, network 103 is a WAN, but this description is not so limited. A proxy pair comprises a client-proxy CP 108 and a server-proxy SP 110. CP 108 is interposed between client 102 and network 103, while SP 110 is interposed between network 103 and a server 104.

For the sake of clarity and simplicity, client 102, server 104, CP 108, and SP 110 are shown as separate computing entities, but that need not be the case. Most of the description below assumes that CP 108 and the SP are "in-path" between client 102 and server 104 such that all network packets sent from client 102 to server 104 pass through CP 108, then SP 110, then reach server 104, and vice versa, but other paths are possible. There may be any number of other hosts and/or network devices (not shown), comprising a routed data network, between client 102 and CP 108 and SP 110 and server 104.

Later discussion describes elements of relevant systems with respect to the topology of FIG. 1, however other more complex topologies are possible. For example, FIG. 2 shows how multiple devices can be present in a networked environment.

Figure 2:
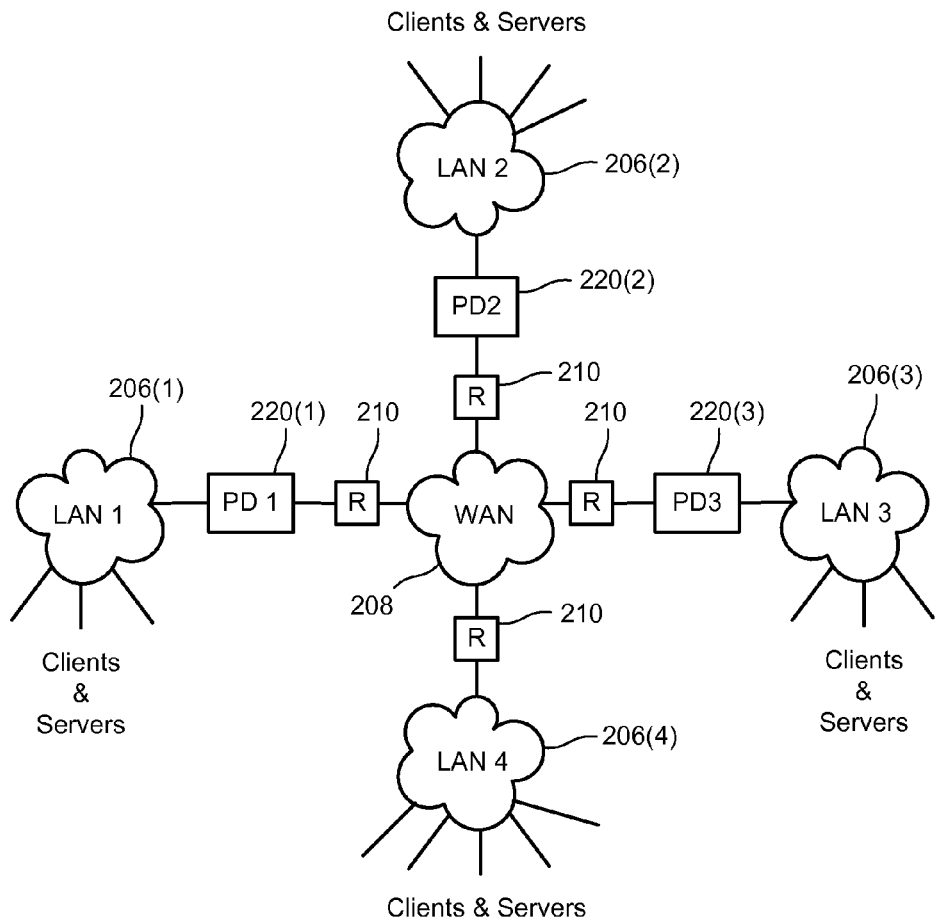
FIG. 2 is a block diagram of a networked system wherein various LANs are coupled to a WAN, some of which include proxy devices and some of which do not.

In the topology of FIG. 2, four LANs 206 are coupled in an internetwork including a WAN 208, which interfaces to each of the LANs in this example via one of a plurality of routers 210, as might be conventionally used. Some LANs 206 are coupled to their respective routers 210 directly (e.g., LAN 4), while others are coupled via a proxy device PD 220 (e.g., LAN 1, LAN 2, LAN 3). Note that each LAN 206 might support both clients and servers, each of which might use the services of their proxy device and possibly other proxy devices.

As an example of a client-server connection, a client on LAN 1 might initiate a connection to a server on LAN 2. The connection could be proxied through PD 1 and PD 2 to enhance performance. Similarly, a client communicating from LAN 3 to a server on LAN 1 might benefit if the connection were proxied by PD 3 and PD 1. However, if a client on LAN 1 were to communicate with a server on LAN 4, no such paired proxying should occur because there is no proxy device present for LAN 4. Proxies are preferably able to automatically determine where and when other pairable proxies are present on paths between a client and a server so that connections are not intercepted at either end unless a proxy pair is present. Preferably, connection interception between pairs of cooperating proxies is transparent to communication between the client and server. Transparency results when a client can act as if it is communicating directly with the server and the server can act as if it is communication directly with the client or when conditions are such that modifications or configuration are not required at the client or the server to accommodate the use of proxy pairs.

The proxy pairs are not limited to a homogeneous enterprise network, and can be used and deployed in configurations where administrative boundaries are traversed. One advantage of this approach allows auto-discovery of such device relationships without requiring any explicit configuration to interconnect devices in distinct administrative domains. For example, proxy devices could be placed within the data centers of one or more popular Web sites and within the access networks of one or more Internet service providers. In this way, connections from clients attached to the enabled service-provider network to enabled Web sites are intercepted and processed by the SP (in the Web site data center) and the CP (in the access network). Likewise, if two or more enterprises deployed these devices in their network infrastructure, then client-server connections traversing extranets of two enterprises that were enabled with such devices would have such connections proxied and processed. In both cases, when the client-server connection does not terminate at a proxy-enabled site (or originate from a proxy-enabled site), then the traffic would not be processed and would not be in any way adversely impacted.

Figure 3:
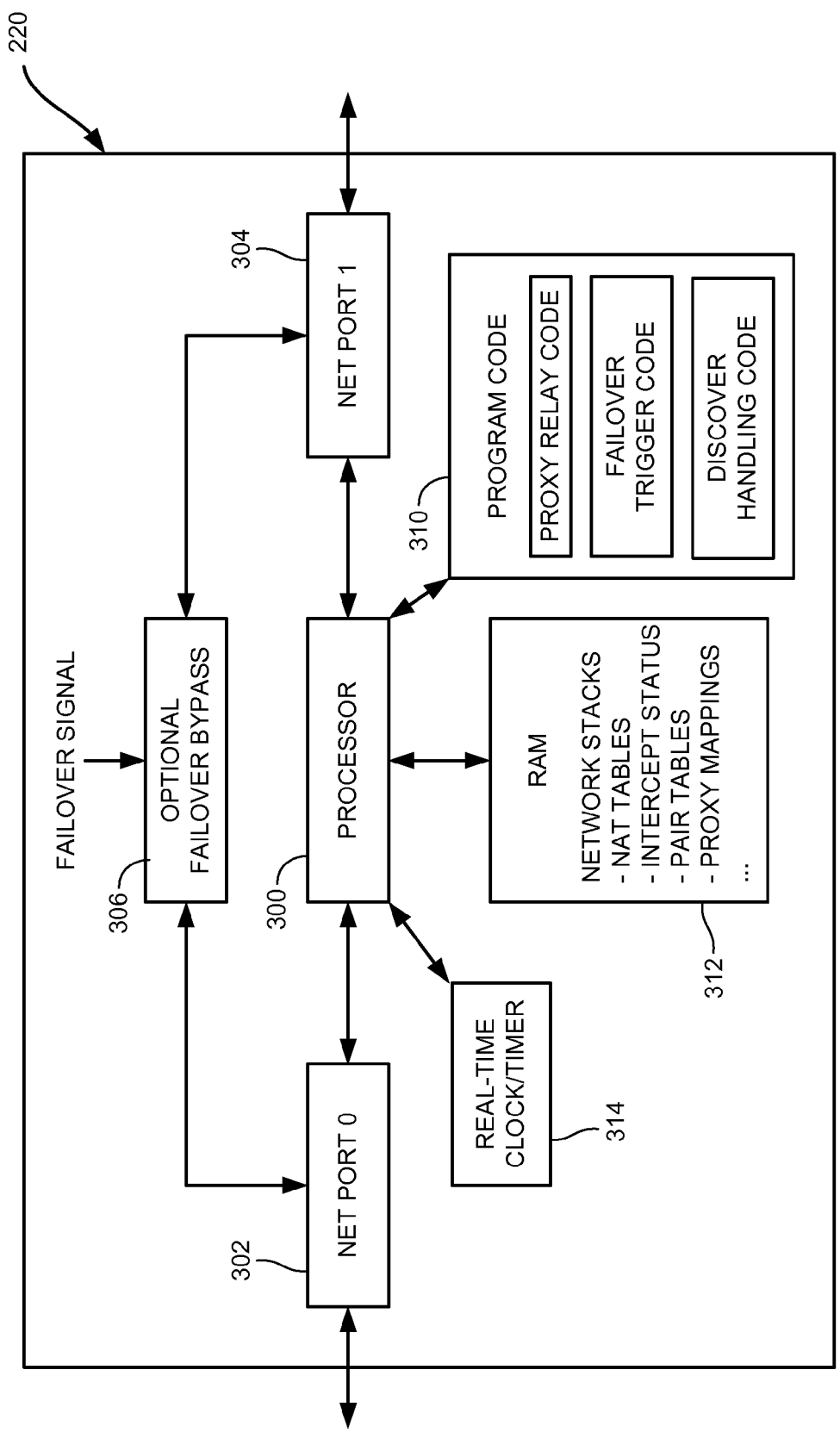
FIG. 3 is a schematic diagram of a proxy device as might be used in the networked systems shown in FIGS. 1-2.

FIG. 3 shows details of one example of a proxy device 220 as might be used in the systems described above. Proxy device 220 is shown comprising a processor 300 that interfaces to the network via network ports 302 (Port 0), 304 (Port 1). Also shown is an optional failover bypass module 306, program code 310 for holding code representing various functionality, random-access memory ("RAM") 312 for maintaining data structures used by processor 300, and a real-time clock/timer 314.

In a typical operation, proxy device 220 receives a packet at port 0, processor 300 might perform some processing, and the original packet or a modified packet is sent out on port 1. In response to a failover signal, such as a signal indicating that processor 300 is inoperative, optional failover bypass module 306 might receive packets at port 0 and output those packets unchanged at port 1 and receive packets at port 1 and output those packets unchanged at port 0.

Failover bypass module 306 might be a dual-port Ethernet NIC with a failover capability. The NIC allows proxy device 220 to be inserted into the path of a 100 BaseT or GigE connection, for example, and act as a transparent Ethernet relay. The proxy device can be inserted into the path between a WAN router and a LAN switch simply by unplugging the router from the switch, plugging it into one of the proxy device ports (e.g., port 0, port 1, etc.) and plugging the other NIC port into the LAN switch. In normal operation, traffic that is not intercepted by a proxy module would be simply forwarded out the adjacent interface by a kernel interrupt handler, much like an Ethernet bridge. Traffic that is processed locally is intercepted by proxy device kernel module and delivered to a local proxy handling process running in user space.

One potential limitation of this approach is that the device is now in the critical path of the network and represents a single point of failure. To address this issue, the dual-port NIC includes a failover mechanism that allows the NIC to automatically bypass the host under exceptional conditions. In particular, the NIC might include a physical bypass circuit built from mechanical relay switches that can short-circuit the two ports into a cross-over configuration in the absence of a signal (such as a heartbeat signal) indicating that the device is operative to process data. In normal operation, the relays are engaged and packets are processed by the host. If such packets are part of an optimized connection, they are diverted to the engine process on the local host. Packets that arrive at the host but are not part of an optimized connection are simply relayed across the NIC to the adjacent port. However, when an exceptional condition arises (software crashes, power fails, etc.), the relays become disengaged. As a result, the two Ethernet cables that are plugged into the NIC become physically interconnected in a cross-over configuration. A software crash is detected by the NIC using a hardware watchdog circuit on the board. If the watchdog circuit is not reset every second or so by the system software (i.e., because the software fails or the operating system crashes), then the NIC disengages the relays, which bypasses the device even if the power remains on.

Given the proxy device's in-path vantage point, it is able to transparently intercept any traffic that it desires. Toward this end, an operator configures the device with the TCP/UDP port numbers and/or application types that are to be intercepted and optimized. All traffic types that are not so configured are simply passed through the device unmodified. Connections that correspond to traffic types that are configured for interception are processed by elements that terminate the transport connection locally and process the client-server protocol messages using techniques described herein or their equivalent. Support for each application/protocol type can be thought of as a "software blade" that is installed in the proxy device.

Figure 4:
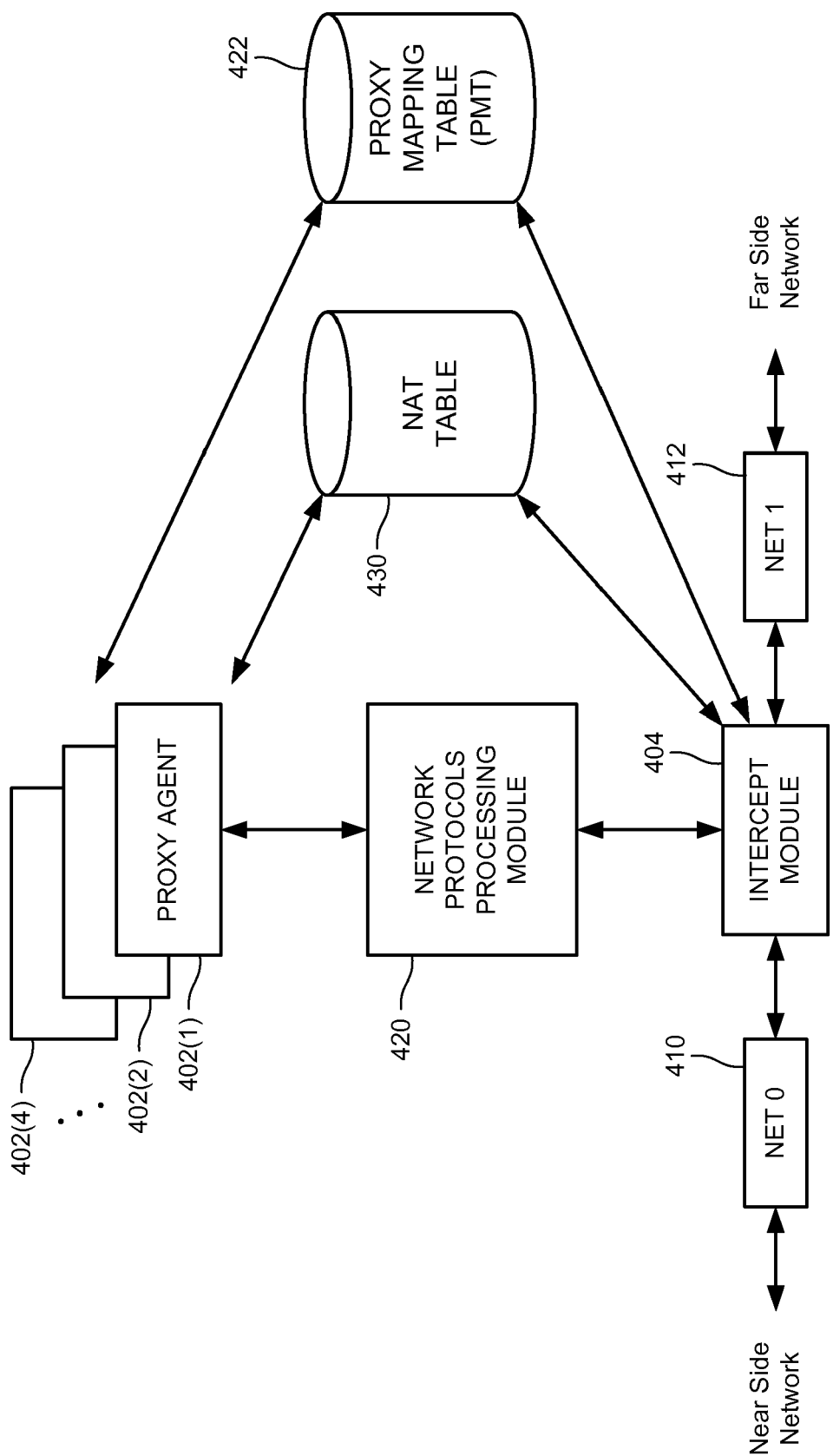
FIG. 4 is a schematic diagram of the proxy device shown in FIG. 3, in terms of modules and storage components.

FIG. 4 is a schematic diagram of proxy device 220 shown in terms of modules and storage components. In a typical embodiment, the modules and agents might be implemented a using code from program code 310 and storage components might be implemented as data structures in RAM 312. In the example shown, proxy device 220 functions as a Layer 2 relay. FIG. 4 shows a set of proxy agents 402, an intercept module 406, a network protocol processing module, and network ports 410, 412. Optional failover components might be present, but are not shown in the figure. Among the data storage structures illustrated, a proxy mapping table ("PMT") 422 and a NAT table 430 are shown. The network protocols processing module 420 implements the end-host versions of traditional network and transport protocols like the IP, TCP, UDP, and so forth.

The two network interfaces 410, 412 cooperate through the intercept module. Intercept module 404 performs an operation akin to that of a two-port bridge—packets that arrive on one interface are forwarded out the other interface. Unlike many bridge devices however, proxy device 220 is configured with a network address and as such, has a presence on the network and can be communicated with directly. Network interfaces 410 and 412, on the other hand, are not assigned network-level addresses but, as usual, are assigned link-level addresses for sending and receiving packets over the attached LAN. When a packet arrives on either of the two network interfaces, if the packets are addressed to the proxy device 220—i.e., the address assigned to proxy device 220 is the same as the destination address of the arriving packet—then intercept module 404 directs the packets to the network protocol processing module 420. Packets that originate from within a process or module inside proxy device 220 are transmitted out one or both of the network interfaces. In addition, intercept module 404 may alter the normal packet processing to cause traffic to be intercepted and delivered to a local proxy agent, when in fact, the traffic was originally addressed to some other end host.

A proxy agent 402 is instantiated as the terminus point for the client and server connections that are intercepted by proxy device 220. Alternatively, one global proxy agent might handle all proxy agent functions regardless of the number of connections handled. While exceptions might be possible, it is expected that one proxy agent would be instantiated for each proxy pair of which proxy device 220 is a member and there is a one-to-one correspondence between proxy pairs and connections handled. Intercept module 406 includes logic to divert some network traffic to one of the proxy agents, which may in turn make additional network connections to other hosts to handle the network traffic. Intercept module 406 may also modify packets and forward those packets out the host, as described below. When a proxy agent makes additional network connections to other hosts or other proxy devices, it may consult PMT 422, which maps server addresses to one or more nearby proxy addresses. This allows the proxy agent 402 to determine the server-side proxy to communicate with for the client-server session that it processes. Proxy agent 402 might also consult NAT table 430 to determine the original destination or source address of packets (or of the connection end-points that carry the packets) if they had been rewritten.

The entries in PMT 422 could be manually populated by an operator using explicit knowledge of the deployment. However, while such manual configuration provides a great deal of flexibility, it also burdens the operator not only with a fairly complicated setup process, but also requires constant maintenance of these tables as the server and network infrastructure evolve. A better approach is to automatically discover the mapping as described herein. Performing such automatic discovery can be done without introducing any extra connection setup delay (for both intercepted as well as nonintercepted traffic). Thus, the entries in PMT 422 may be populated by intercept module 406 using methods described later.

Intercept module 406 manages and utilizes NAT table 430, which contains network address translation rules that are used to modify packets accordingly.

In one embodiment of a proxy device, the proxy device is realized from a general-purpose computer running a standard operating system such as the Linux™ or Microsoft Windows® operating systems with extensions. As a standard computing host, the proxy device's operating system kernel might implement a standard network stack, with intercept module 406 added as extensions to the kernel environment. The proxy agents might run as user processes, with intercept module 406 using techniques described herein to divert client and/or server connections to a proxy process.

Figure 5:
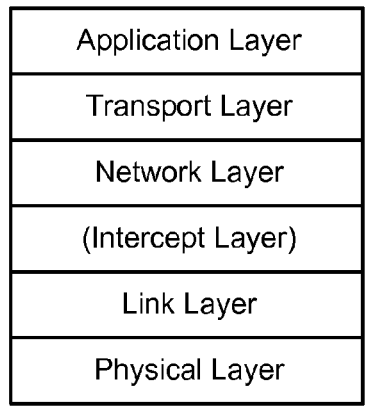
FIG. 5 is a layer diagram illustrating a position of an intercept layer.

FIG. 5 is a layer diagram illustrating a position of an intercept layer in a network stack that could be implemented in the client and server end hosts. In this case, the only packets that are processed by the host are those that are addressed to it. This particular example shows the intercept module as a part of the network stack integrated between the link layer and the network layer. Thus, much as in the deployment described in FIG. 4, the intercept module has the opportunity to examine and potentially modify packets before they are processed by the network layer. This deployment scenario assumes that the client and/or the server would be configured with whatever functionality a proxy would be performing. As such, the proxy agent is not a separate process but is shown as a part of the client/server process running as an application on the host. Furthermore, the end-host implementation could be combined with the network device implementation in a hybrid configuration.

Probe Query

Figure 6:
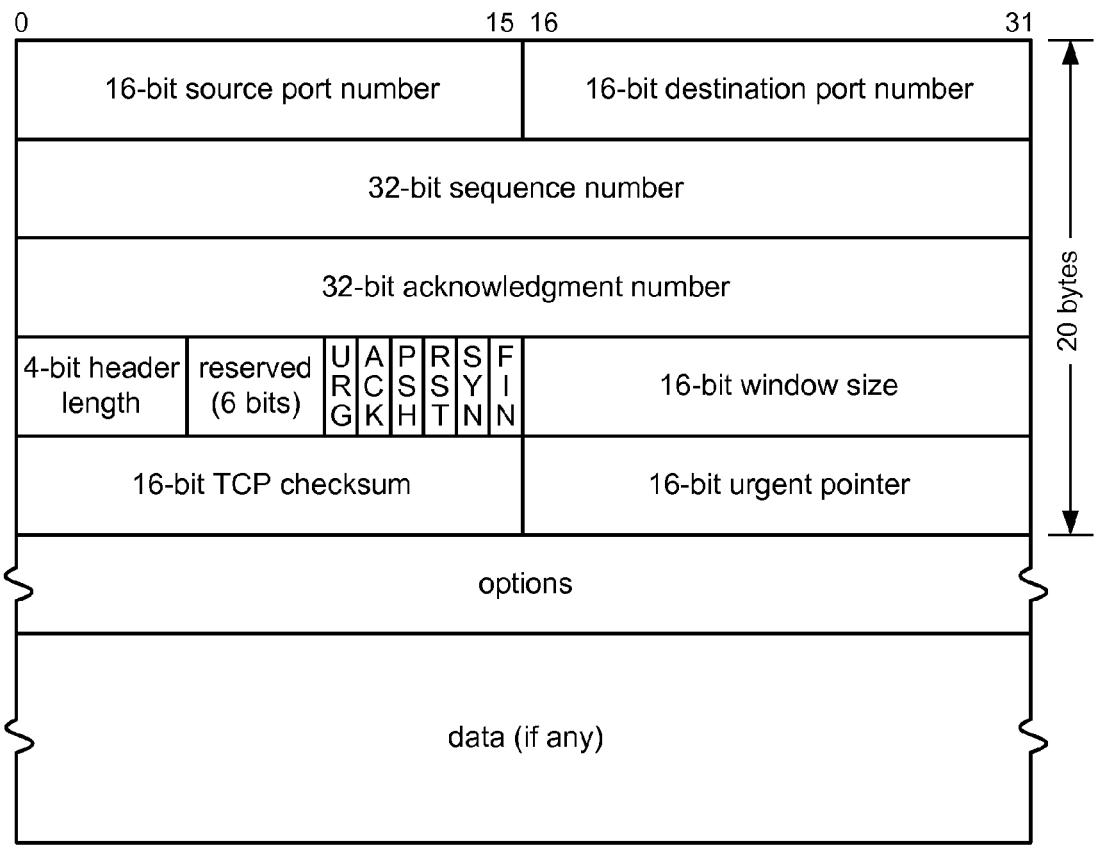
FIG. 6 is a schematic diagram of a packet including optional fields for signaling, and proxy devices.

FIG. 6 is a schematic diagram of a packet including optional fields for signaling, and proxy devices as might be used for probe queries and probe responses. Probe queries as described herein are one method or apparatus for signaling the presence of a proxy to other proxies. Probe responses as described herein are one method or apparatus for return proxy signaling in response to proxy signaling.

As shown in FIG. 4, a proxy device includes two network ports (and might have more, unshown ports). For a transaction, one network port is associated with a client direction while the other network port is associated with a server direction. The proxy device treats the first network port as the source of packets from the client and treats the second network port as the source of packets from the server. For sending packets towards the client, the proxy device uses the first network port and for sending packets towards the server, the proxy device uses the second network port. While a particular network port might be towards a client for one transaction and towards a server for another transaction, the term "client port"

used with reference to a connection or transaction refers to whichever port is being used to interface, directly or indirectly, towards the client and the term "server port" refers to the other port that is being used to interface, directly or indirectly, towards the server. Also, when and if the proxy device does not know the port that is toward the client or toward the server, it may send a copy of the packet out both ports.

Upon receipt of a packet from the client port where the proxy device is a CP for the transaction associated with the received packet, the intercept module determines what actions to take on the received packet. If the PMT does not have an entry for a destination server associated with the destination found in the received packet, the intercept module attempts to learn whether or not a corresponding SP exists on the network path, and if so, its network address.

To detect and identify an SP, the CPs intercept module constructs a probe query packet and transmits that packet towards the server. The CP can then determine, based on the events that occur after sending the probe query packet, whether or not there is an SP on the network path. Likewise, even if the PMT has a mapping for a particular destination server available and a connection request for that server is received, the CP intercept module optionally generates a probe query packet to refresh the mapping. Optionally, as described later herein, the intercept module may decide to handle the connection in other ways, rather than probe for a server side proxy, based on user configuration.

In preferred implementations in particular networks, the CP constructs a probe query packet by attaching a probe query option to the network or transport layer options portion of the connection request packet as illustrated in FIG. 6. This allows optional messages to be piggybacked on an existing packet. Often, these optional messages are simply called "options". The CP makes use of options data by attaching a new option to the list of options that is already present in the packet, thereby advertising its own existence on behalf of the client. The option code is an assigned number that uniquely identifies the option as being a probe query. The CP may store some state in the PMT indicating that a probe has already been sent for the given server.

After appending the option code, the probe query packet is forwarded along the network path towards the server by the normal network delivery process. If an SP exists along this path, it detects the presence of a probe query option in the packet. The detecting SP then transmits a probe response back towards the client, expecting that this probe response will be detected by the CP. By sending this probe response, the SP informs the CP of its own existence, including related contact information (e.g., its network address and a transport port). In addition, after sending the probe response, the SP might not forward the connection request packet towards the server, instead dealing with it locally. Because the SP knows that a proxy pair can be formed with it and the signaling CP, the SP expects that the CP, upon receiving the probe response packet, will intercept and proxy the connection. With the CP proxying the connection, the client's connection request packet should not be forwarded to the server, which would respond by establishing a connection with the client. Instead, the SP will establish a connection to the server as needed.

One advantage to this approach is that if there is no SP on the path between the CP and the server, the modified connection request packet (i.e., the original packet with the appended probe query option) is received by the server host. According to the network and transport protocol specifications, unrecognized options are ignored by participating hosts. Thus, when a server receives a modified connection request from a client, the probe query option is ignored and a connection response packet is sent to the client, establishing a network session with the client exactly as if no probe option were present in the connection request. Additionally, when the server sends a connection response packet along the network path towards the client, the response passes through the CP. The CP can thereby implicitly detect that there is no SP on the path towards that particular server and can act accordingly. For example, the CP can just forward traffic or take other actions that do not require a proxy pair, or other actions as described herein.

Other embodiments of the probe query mechanism may be realized as well. When the CP intercepts a connection request packet, instead of modifying the packet and appending a new option code, it could stall the packet and instead send a probe query packet of any form towards the server. For example, this alternative probe query could simply be a new TCP connection request packet on a well known port that is intercepted by all SP agents. The CP then waits for a certain amount of time, expecting to receive an acknowledgment of whether or not there is an SP in the transport path towards the server. If an SP responds to this connection request, the CP knows that it can intercept the connection, and as such, forwards the stalled connection request packet to the NAT system and then to the local agent process. If the CP receives a negative acknowledgement, or does not receive an acknowledgment by a certain time threshold, it concludes that there is no SP in the path, and the stalled connection request packet is forwarded to the server unmodified.

In another embodiment, the CP sends the original connection request in parallel with a new query packet. This has the benefit that no connection requests are ever delayed as a result of the probing operation, yet also means that a connection request may pass through two proxies without being intercepted. However, the results of the probe query process could be used for future connection requests, so only the first connection attempt ends up being passed through unmodified.

Probe Response

As described above, if there is an SP in the path from the client to the server, then that SP should intercept probe query packets coming from the CP and send a probe response of some form, indicating to the CP its own existence and contact information. In the preferred embodiment, the probe response packet is constructed as a modified connection response packet that corresponds to the modified connection request packet. The SP also makes use of the options portion of the packet header, adding a probe response option conveying its network address and transport port information in the option data.

As the probe response packet is a simulated connection response packet, it is sent on the network with a source address corresponding to the server and a destination address corresponding to the client. The packet is then sent on the reverse path (i.e., towards the client) in lieu of sending the connection request to the server. Assuming the network paths are symmetric, the client-side proxy detects this response packet and acts on it. In other embodiments, the probe response is a special response packet sent from the SP to the CP communicating the SPs contact information as well as whatever other information might be helpful in allowing the proxies to coordinate and cooperate with one another. For example, the SP may include a list of addresses of other candidate server-side proxy devices to clustering and/or load balancing, as described later.

The CP acts on a response packet by updating the PMT with a new map entry indicating that for the given destination server (and possibly port), there is an SP in the path. The SP contact information is extracted from the probe response and installed in a mapping entry. In addition, the CP installs an entry in the NAT table that rewrites the IP destination address with the local proxy IP address for all packets corresponding to the client server session in question.

In the first embodiment above, when receiving a probe response packet, the CP reconstructs the original connection request packet from the probe response packet that was derived from the probe query packet. Then, because a NAT table entry now exists for the client server connection in question, the original connection request is then forwarded to the local proxy agent. As described below in more detail, the CP communicates with the SP to establish a proxied connection between the client and the server, making use of NAT tables to operate transparently.

If the CP observes a connection response coming from the server without the SP signaling for a connection that the CP signaled towards the server, the CP can conclude that there is no SP in the path. Alternatively, other implicit tests might be employed, such as relying on a timer, waiting for a future connection request from the same client, or other techniques. However, if the CP concludes that a SP is not present, or a previously detected SP is no longer present, the CP updates its PMT with this new information by installing a map entry for the destination server indicating the absence of a proxy (setting the entry to "no-proxy").

The mapping entries that are dynamically added to the PMT may become inaccurate over time. For example, a route in the underlying network might change so that the SP on the path for a particular server S may no longer be present on that path. Likewise, a CP could be installed and enabled before its corresponding SP is installed; then, once the SP is installed, the CP will erroneously assume the SP is not present as an entry indicating so is in the PMT. To handle this consistency problem, some embodiments of proxy devices occasionally (such as periodically according to a timer) refresh map entries in the PMT.

Logically, each map entry might have a refresh timer associated with it. When the timer expires, a probe is proactively sent toward the server in question to determine if the corresponding SP is still present on the path (or if a different SP happens to become present). Alternatively, the mapping entry could be simply removed from the PMT, as a subsequent connection request would simply result in a new probe. This timer based approach could be optionally complemented with a connection driven approach. With a connection driven approach, each time a connection request is processed, a probe is proactively sent toward the server in question to determine if the corresponding SP is still present on the path.

Actions Taken by an Intercept Module

Figure 7:
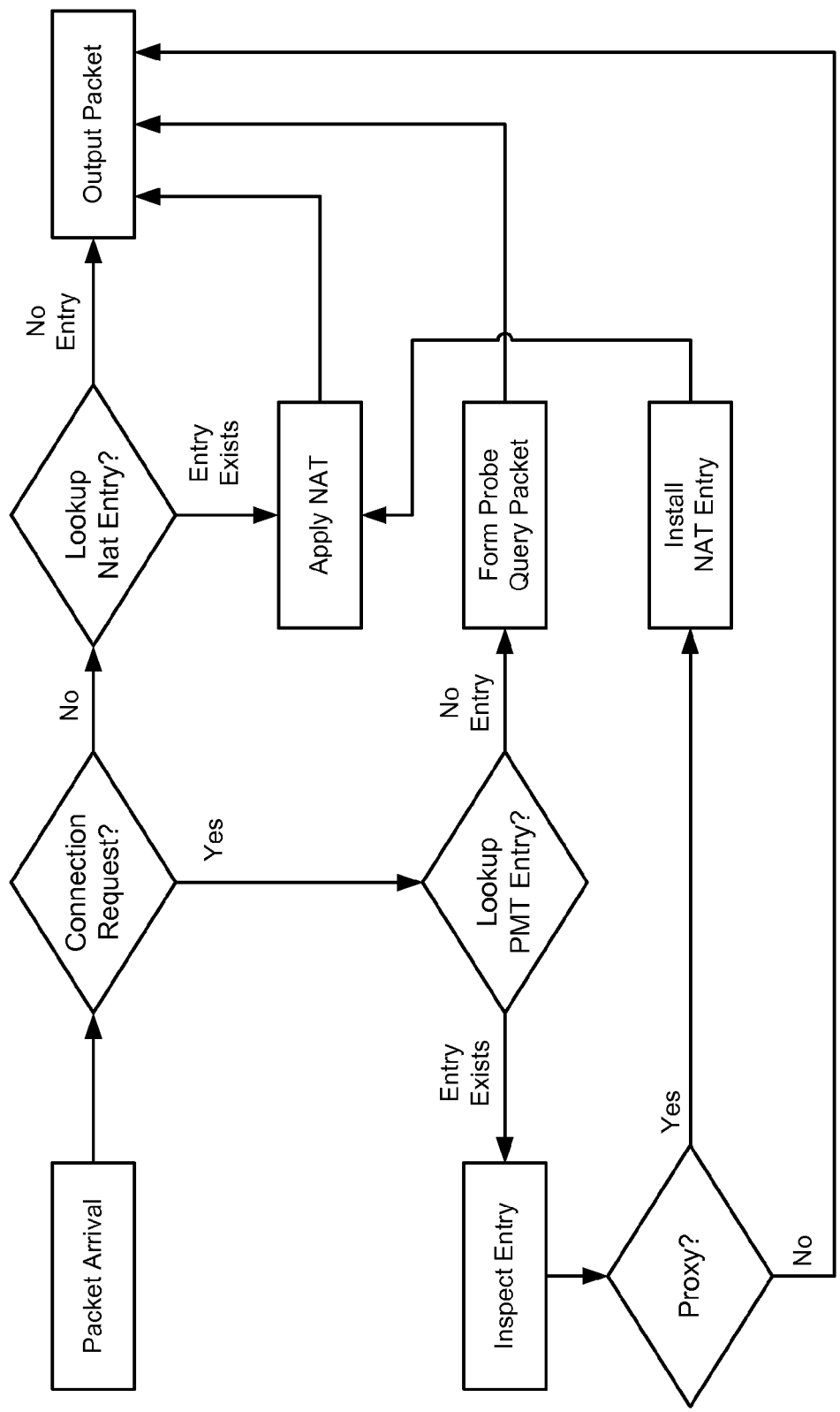
FIG. 7 is a flowchart illustrating actions taken by an intercept module when a packet passes through a proxy device.

FIG. 7 is a flowchart illustrating actions taken by an intercept module when a packet passes through a proxy device. The flowchart elements correspond to major components of an intercept module and the various operations and decisions that are made as a packet traverses through the intercept module. The description immediately below is generally from the point of view of the client-side proxy. The actions of the server-side proxy are described further below. This flowchart is merely illustrative as the functionality embodied herein can be accomplished by variations in these steps whereby such steps might be reordered, processed by different modules, and so forth.

In general, when a packet arrives on one of the proxy device's interfaces, the intercept module examines the packet to determine if it is destined for the local host (i.e., it is addressed to the local proxy device or it is a broadcast or multicast packet). If so, the intercept module passes the packet to the local network stack. Otherwise, the intercept module examines the packet to determine if it is a connection request packet. The exact semantics of what determines a connection request packet depend on the network and application protocols that are being proxied.

For example, in TCP, a connection request is noted by the presence of the "SYN" bit in the flags field of the TCP protocol header. Other applications may use a protocol such as UDP, which does not define specific connection semantics. In this case, the first packet of a UDP flow can heuristically define the start of a connection, where a UDP flow may be defined as all packets with a common source network address, destination network address, source UDP port, and destination UDP port. Likewise, the end of a connection can be implied by the absence of packets from a flow for a certain amount of time.

For connection request packets, the intercept module determines whether and through where the connection should be proxied. To do so, the intercept module builds and maintains the proxy mapping table (PMT). This table tracks the network addresses of proxies that are situated on the path to a particular connection destination (i.e., server). That is, in order to proxy a connection for a particular server S from the CP through an SP to S, the proxy agent in the CP maps the address of S to the address of SP, and the PMT provides this capability.

Each packet is also checked against the NAT table 430 to determine if the network addresses and/or transport ports of the packet should be rewritten. NAT protocols and processes are described in Request for Comments (RFC) 1631, which is generally available and is incorporated herein by reference for all purposes, though NAT is employed herein to facilitate connection interception rather than providing address-translation between private and public networks. The entries in the NAT table match the endpoints of an established network connection, i.e., they specify the transport protocol, the source address/port and the destination address/port. If the packet's address and port information match an entry in the NAT table, then the destination address of the packet is rewritten to be the target address listed in the table, which in the case of input packets, is the local address of the proxy host, and the packet is forwarded to the local network stack, where it is intended to be received by a local proxy agent. Because the address has been rewritten and the proxy agent does not have access to the old address (but may require it to perform its function), the proxy agent can query the NAT table to determine the original destination of the packet (i.e., the destination address of the packet before its destination address was rewritten). This mechanism causes the client to believe that it has a connection established with the original server even though the connection is terminated at the local proxy agent in the CP.

The intercept module also receives each packet that is sent from a proxy agent on the local host and NAT table 430 is similarly consulted when packets are sent from the proxy host towards the client or server. In other words, packets that originate from a local proxy agent are checked against the NAT table to determine if the network addresses and/or transport ports of the packet should be rewritten. Unlike prior art methods for proxying transport connections, this mechanism causes the server to believe that it has a connection established with and addressed to the original client even though the connection is terminated at the local proxy agent in the SP. This contrasts with a Web proxy, for example, where the proxy creates a connection with the server and the server terminates a connection from that proxy and the proxied client address or addresses are ultimately invisible to the server.

Through the use of NAT in this fashion, the CP proxy agent establishes a network connection with the client such that the client believes it is communicating with the server, and correspondingly, the SP proxy agent establishes a connection with the server such that the server believes it is communicating with the client, where belief is sometimes represented simply as acting as if that were the case and having operations proceed normally as they would if the believed fact were true.

A packet that is not a connection request and that does not match an entry in the NAT table is simply forwarded unmodified to the interface opposite of where the packet originally arrived, thus providing a transparent relaying function for traffic that is not to be proxied. This traffic includes packets such as link-level broadcast or multicast packets, as well as packets that are not to be proxied because the probe mechanism described herein did not discover a second proxy device on the path to the server.

Given the PMT and a new connection request, the intercept module looks up the destination address of the connection request in the PMT. If the PMT indicates that there is a corresponding proxy on the network path, the intercept module proxies the connection to the local proxy agent by installing a new NAT rule for the connection in the NAT table. This ensures that future packets that are part of the connection will be forwarded to the local proxy agent. The connection request packet itself is then sent through the NAT operation and thereby forwarded to the local proxy agent, which establishes a new connection with the client. Because of the NAT operation, the CP establishing this connection with the client appears to the client as if it were the server.

In the above-described example, because the connection is terminated at the local proxy agent, there is a chance the connection is set up successfully even though the server may have crashed or otherwise would refuse the connection from that particular client. To deal with that condition, the CP might delay the establishment of the client-to-CP connection until the SP-to-server connection has succeeded. This can be accomplished by having the CP delay the acknowledgement of the connection request (e.g., in TCP, by delaying the transmission of the SYN-ACK packet) until a message is received from the server or SP indicating that the SP-to-server connection has been successfully established. If the SP-to-server connection fails for some reason, the SP notifies the CP and the CP then resets the pending connection (e.g., in TCP, by sending a reset packet back to the client).

If a probe attempt determined that there is no SP on the path to the server, the PMT stores a "no-proxy" map entry indicating that this probe attempt failed. When a connection request for the server is looked up, the no-proxy disposition informs the proxy device to avoid proxying the connection and instead, the connection request packet is simply forwarded unmodified towards the server. Because no NAT is configured for this connection, all remaining packets for this connection are bridged without modification.

Connection Interception

As mentioned above, when a connection request packet arrives at a CP and the PMT has a map entry corresponding to the destination server in the connection request packet, then the connection request packet is forwarded to the local proxy agent on the CP. Due to the NAT table in the CP, the proxy agent establishes a connection with the client such that the client believes it is communicating with the server. The CP proxy agent then establishes a connection of some form with the SP, which is identified by consulting the PMT using the server destination address of the original client connection. This may be a new network connection from the CP to the SP, or a new virtual channel representing the client-server connection multiplexed over an existing network connection between CP and SP. In the virtual channel case, messages from various client-server sessions between common CP/SP pairs can be multiplexed onto a single transport connection or virtual channel. Each message includes a header that identifies the client-server session. When a message is received at the CP, the header and the message are transmitted over the virtual channel to the SP, which decodes the header, reads the message, and forwards it onto the appropriate server connection.

When the SP receives the new connection (or virtual connection) from the CP representing the client-server connection, the CP sends the SP a message informing the SP as to which server and port the original client connection should be sent. The SP, in turn, installs an entry in the NAT table that maps the source address of the forthcoming SP-to-server connections to the original client address. Then, the SP initiates a connection to the target server and port, and by virtue of the NAT, a connection is established between the server and the SP such that the server believes it is communicating directly with the original client.

Figure 8:
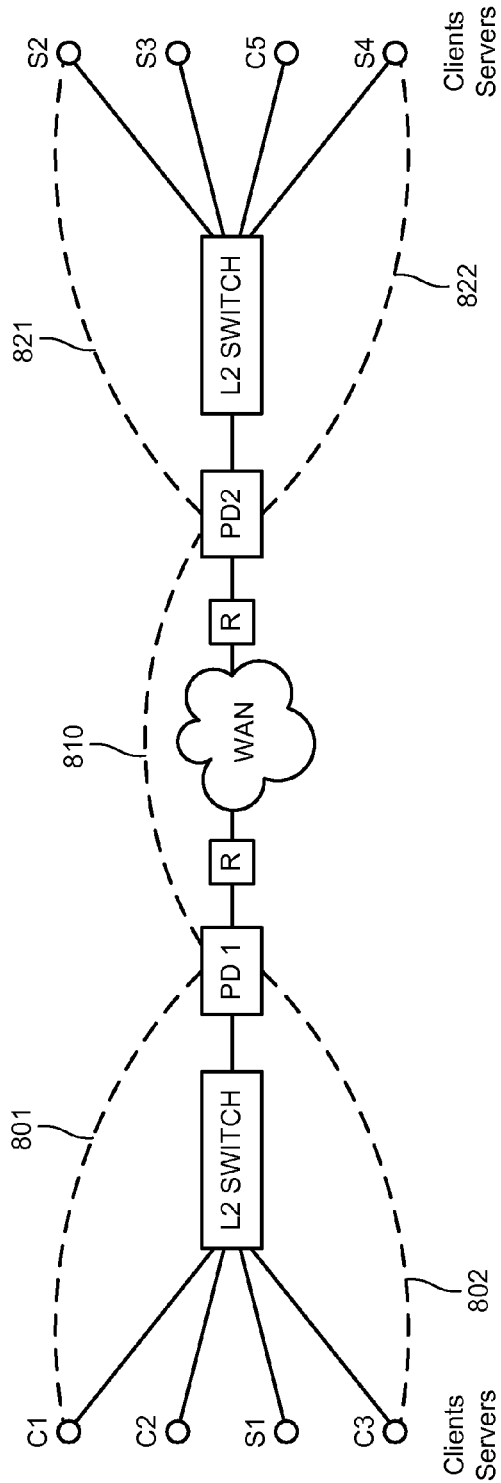
FIG. 8 is a diagram illustrating multiple connections used for interactions between clients and servers over a WAN.

FIG. 8 is a diagram illustrating this multi-connection approach used for interactions between clients and servers. As shown there, several clients and/or servers are coupled to and L2 switch that is in turn coupled to a first proxy device PD 1. Proxy device PD 1 is coupled, via routers and a WAN, to a second proxy device PD 2. Proxy device PD 2 is in turn coupled to a second L2 switch that serves another set of several clients and/or servers. Proxy device PD 1 is a CP and proxy device PD 2 is an SP for the example transactions shown, but it should be understood that a proxy device could be a CP and an SP at the same time for different transactions. The proxy devices might execute the auto-discovery protocols described herein, or are otherwise configured to be aware of each other.

Various network connections are illustrated by dashed lines. Suppose client C1 desires a connection to server S2. The connection is transparently intercepted such that client C1 ends up with a transport connection 801 terminated at the CP, but because of NAT, client C1 cannot tell that it is not in fact communicating directly with server S2. Likewise, as part of the process, the CP establishes a different transport connection 810 between itself and the SP.

In turn, the SP establishes a transport connection 821 that corresponds directly to the client's transport connection 801. Because of NAT, server S2 cannot tell that it is not communicating directly with client C1.

Then, whenever client C1 sends a message over connection 801, the CP relays it over connection 810 to the SP, which relays it over connection 821 to server S2. Likewise, whenever server S2 sends a message over connection 821, the SP relays it over connection 810 to the CP, which relays it over connection 801 to client C1.

If another client, C3, initiates a transport connection to another server, S4, the connection is transparently intercepted such that client C3 ends up with a transport connection 802 terminated at the CP. Because of NAT, client C3 believes it is communicating directly with server S4. Likewise, as part of this process, the CP can reuse the transport connection 810 between itself and the SP to handle messages between client C3 and server S4. In turn, the SP establishes a transport connection 822 corresponding directly to the client connection 802, and because of NAT, server S4 believes it is communicating directly with client C3.

Following that setup, whenever client C3 sends a message over connection 802, the CP relays it over connection 810 to the SP, which relays it over connection 822 to server S4.

Likewise, whenever server S4 sends a message over connection 822, the SP relays it over connection 810 to the CP, which relays it over connection 802 to client C3.

Because connection 810 is used by both the C1/S2 session as well as the C3/S4 session, a method for associating data transmitted over that connection to the appropriate session must be employed. As described earlier, this can be accomplished by including a header with each transmitted message that indicates the client-server session associated with the transmitted message.

Transparent interception is described above. Proxy devices might also use nontransparent interception. In nontransparent interception, the addresses of the proxy devices are exposed to the end devices. Thus, the address of the CP might be exposed to the client and the address of the SP might be exposed to the server, with each end device configured to talk directly with its corresponding proxy device client.

Certain protocols like CIFS, NFS, and HTTP are amenable to nontransparent operation as those protocols allow the client to communicate directly with an intermediary that has a different address from the origin of the communication. This architecture is feasible, but it can be challenging to deploy. There are many different approaches to solving the integration challenges of nontransparent configuration, but they typically require hard to maintain (either manually or automatically) mapping tables in the proxy devices. That is, in order for a client side proxy device to know what server side proxy device to connect to, it must somehow learn what server the client actually wants to communicate with (via protocol specific knowledge or some protocol specific mapping model), and in turn, must learn what server side proxy device is near the server in question. This is in general complex and cumbersome, except for protocols like HTTP that were explicitly designed to allow a client to connect explicitly to a proxy and have the client include the server's name in every header of every request message. Thus, where there is some advantage to nontransparent operation and it is feasible, it can be used instead of the transparent interception described herein.

In other cases, a hybrid configuration is desirable, where transparency is used at the CP but not at the SP. In this configuration, the server side NAT is not employed alleviating the requirement that the server side proxy be in the direct network path. This is a benefit in the data center, where very high bit rates might be concentrated onto one or two primary network links.

Transport Optimization

Once a proxy pair is established, there are number of possible actions that the proxy pair could take. Some of those actions might involve optimizing the transport. While there are a great many optimizations that may be carried out with a proxy pair, one particular mechanism involves transport protocol optimization whereby the client and servers implement legacy transport protocols while CP-to-SP connections are supported with more modern or otherwise optimized transport protocols. In this fashion, the client and server may implement legacy versions of transport protocols across a LAN, where protocol performance is not necessarily crucial, while enjoying the protocol enhancements of a different transport protocol between and among proxy agents.

In one embodiment, this transport protocol translation is applied to TCP, wherein two TCP end points believe they are speaking to one another by virtue of the transparent interception. The CP-to-SP protocol can be virtually any protocol mechanism that allows the proxies at both ends to emulate the reliable, in-sequence delivery semantics of TCP. One such approach is to implement a modified form of TCP for the CP-to-SP protocol that implements the reliability semantics of TCP but enjoys different congestion control dynamics. Congestion control refers to methods that networks use for discrete network connections to parcel the available network bandwidth on a shared network link. One aspect of TCP's congestion control algorithm is the notion of "slow start", whereby a TCP connection slowly increases the amount of bandwidth available to an application to avoid flooding a potentially constrained link with data. The main drawback to a slow start TCP connection is that an application that has a short lived connection may never reach the full link capacity since the slow start mechanism does not complete its ramp up before the connection is no longer needed.

With a pair of proxies in the network path, it is possible to intercept a number of TCP connections and multiplex them over a single long-lived connection between the two proxies. This long-lived connection would be able to avoid the problems of slow start, even if each individual connection is short lived. In addition, it is possible for the two proxy hosts to employ more sophisticated congestion control algorithms for the multiplexed connection channel, which can result in better performance for the set of proxied connections.

Other enhancements can be made to the congestion control algorithm in the CP-to-SP connection, such as those described in Floyd, S., "High-Speed TCP for Large Congestion Windows", IETF Internet Draft draft-floyd-tcp-high-speed-02.txt (Feb. 20, 2003) [available at http://www.ietf.org/internet-drafts/draft-floyd-tcp-high-speed-02.txt] (hereinafter "Floyd"). Techniques described in Floyd change the TCP congestion control dynamics to provide significant performance enhancements in high-latency environments and have a number of other benefits.

Multi-Hop Automatic Proxy Path Discovery

Figure 9:
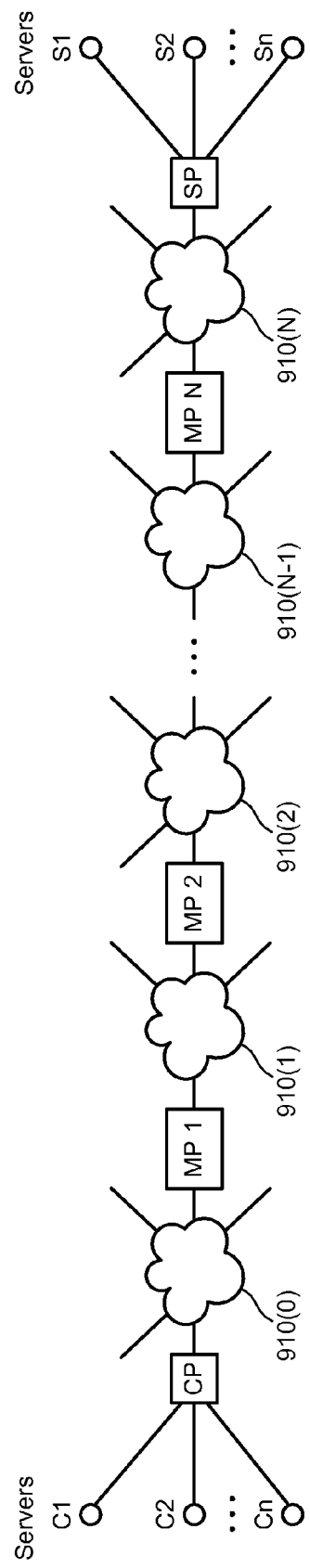
FIG. 9 is a diagram illustrating the use of more than two proxy devices in a network path, including a client-side proxy, one or more middle proxies, and a server-side proxy.

FIG. 9 is a diagram illustrating the use of more than two proxy devices in a network path, including a client-side proxy, one or more middle proxies, and a server-side proxy. While most of the examples used so far presume a configuration comprising a pair of exactly two proxies (one named "CP" near the client and one named "SP" near the server) and three transport connections (i.e., one between the client and CP, one between the CP and the SP, and one between the SP and the server), the present invention also encompasses topologies containing more than two proxies and more than three transport connections.

As shown in FIG. 9, a client-server connection may be transparently intercepted, processed and proxied via a sequence of more than two proxy devices. As shown there, a client communicates with a server via a connection to a client-side proxy CP, which in turn communicates through a network 910(0) with a first middle proxy MP 1, which in turn communicates through a network 910(1) with a second middle proxy MP 2, and so on to an N-th middle proxy MP N, which in turn communicates through a network 910(N) with a server-side proxy SP, which ultimately communicates with the server. In this example, multiple clients and multiple servers are shown. As explained above, it need not be the case that the clients are all at one end and the servers are all at the other end. Thus, the CP might be a proxy device that also is an SP for other connections and the SP might be a proxy device that is also a CP for other connections. As illustrated, networks 910 include other connections and branches.

In this embodiment wherein more than two proxy devices are in the network path and are to be active for a client-server connection, a proxy device discovers whether it is acting as a client-side proxy by, among other techniques, detecting the absence of proxy signals or probes and discovers whether it is acting as a middle proxy or a server-side proxy by forwarding probe packets on to the server while simultaneously sending a probe responses to the CP (or a downstream middle proxy). As a result, each proxy device will either see a connection request acknowledgement returned from the original server or a probe response packet coming from another proxy upstream on the path toward the server. In the former case, the proxy determines that it is an SP and acts accordingly (e.g., installing the server side NAT state and so forth). In the latter case, it determines it is a middle proxy and acts accordingly (e.g., by relaying messages from the client in question to the upstream proxy in question and vice versa from the server to the client and performing other actions expected of a middle proxy).

Throughout this disclosure, where there are multiple instances of an object and the number of instances is not critical, the instances are numbered from "0" or "1" to "N" with the understanding that the value of "N" need not be identical from use to use. For example, "N" is used as the number of clients, servers, proxies, etc., in various places, but that number might vary from example to example. It should also be understood that nothing here requires that all instances be used. For example, FIG. 9 shows clients C1, C2, . . . , CN, servers S1, S2, . . . , SN, and middle proxies MP 1 through MP N. It should be understood that the number of clients, servers and middle proxies need not be identical and the actual number is not essential to an understanding of what is being shown.

Variations

With a proxy pair in place, a number of advantages accrue and other network improvements are made possible. For example, using techniques described herein, a network administrator can deploy a proxy pair that would transform and proxy all TCP connections using techniques described herein. This can be done without requiring an upgrade of every device, server, and application that uses TCP with modern protocol enhancements to improve performance. WAN performance of all applications can be improved with the simple and straightforward deployment of such devices at appropriate points in a network infrastructure.

In some embodiments, messages are actually modified to provide additional performance benefits. For example, client-server transaction acceleration techniques as described in McCanne I can be implemented to transform network transactions for wide-area bandwidth optimization. Similarly, client-server transaction prediction mechanisms as described in McCanne III can be employed in a pair of proxy agents to mask effects of wide-area latency and thus provide significant reductions overall latency leading to increased client-server performance.

Connection Request Filtering

In some embodiments, the basic proxy discovery and interception mechanisms described herein can be extended with a configuration capability that targets only certain subsets of traffic. For example, a network operator may want to configure the proxy devices to process certain types of client-server connections but to pass through other types of client-server connections unmodified without interception and/or other processing. Specifically, it may be desirable to statically configure some information into the intercept module that alters its behavior based on the protocol or application type of the underlying connections.

One simple addition to the intercept module is the addition of rules that indicate certain actions to take on a class of connections. One type of rule would indicate different actions based on the destination port in the connection request packet. With this addition, the intercept module can choose to ignore connection request for particular configured ports, or alternatively, only act upon connection requests for particular configured ports. More generally, the rule could be a packet filter that is applied to the connection request packet, e.g., specified as a BPF packet filter (McCanne and Jacobson, "The BSD Packet Filter: A New Architecture for User-level Packet Capture", In Proc. of the 1993 Winter USENIX Technical Conference, San Diego, Calif., January 1993). Using the approach described there, whenever the intercept module processes a connection request packet, it could apply one or more packet filters to determine if the connection request should be passed on unmodified, intercepted and processed, or even dropped.

By dropping a connection request packet, the intercept module would implement functionality akin to a firewall, whereby certain connections are allowed to pass through, while others are denied. The fact that the PMT contains dynamic information resulting from the probe operation enables even more sophisticated functionality than available with a simple firewall.

For example, assume two proxies are cooperating to provide security functionality for the network traffic that traverses them, whereby the traffic that is proxied goes through an encryption/decryption process. The intercept module can be configured with a rule that dictates that all traffic should be intercepted if possible to discover whether or not there is a corresponding proxy and any packets destined for servers that do not have a corresponding proxy in path should be dropped instead of forwarded. Using such a rule set, the dynamic mappings resulting from the probe process are used to indicate which connections should be dropped and which should be proxied.

Static Mapping

Static mappings are useful, for example, where the CP is in a network path but the SP is not in the network path. By adding static mappings to the PMT, via a manual network operator process or the like rather than being discovered through the probe process, the SP need not be on the path. The static mapping is marked accordingly so that the intercept module does not attempt to refresh the mapping. A static map entry is similar to a dynamically discovered entry in that it indicates the appropriate SP to use when contacting a particular server. The CP would still intercept network connections, but would not carry out the normal probe process to discover the SP and instead would be directed to the off-path SP (although nothing prevents a network operator from statically mapping an SP that is in the path).

On-The-Fly Connection Interception

Some connections may become established before any proxy could intercept the connection requests. For example, a CP could be powered on and find itself in the path of existing connections. Another possibility is that the network path for a connection could change such that the new path flows through a proxy. It is desirable to intercept these pre-existing connections such that they gain all benefits of using the proxy service.

The intercept module can determine whether a packet flowing through it belongs to a pre-existing connection in several ways. One method is by tracking every connection that flows through it. When a connection request packet arrives at the intercept module, it can begin updating or creating state for that connection, including, but not limited to, the existence of that connection, whether the connection request succeeds, and when the connection is terminated. If a packet arrives for a connection for which the intercept module has no state, then it could conclude that this packet is for a pre-existing connection.

Once the intercept module identifies a pre-existing connection, it could further try to identify whether the connection flows through an SP. It could do this in several ways. One way is to examine a table of known destination to SP mappings; the table's entries could come from previous runs of the proxy discovery protocol, or via manual configuration, or via some other method. It could also attempt some form of proxy discovery protocol for the destination of the pre-existing connection.

Once the intercept module has discovered the peer intercept module on the other side of the pre-existing connection, it can take some action to cause the connection to be intercepted. One such action is to tear down the existing connection by injecting one or more "reset" packets into the client-server session. This will cause the connection to fail, and in some cases, the application will simply establish a new connection with the server automatically. When the new connection request flows through the CP, it can then go through the process described in earlier to cause the connection to be intercepted. Other applications may report an error to the user and halt the process when their underlying connection or connections fail. To address this, rather than reset the connection, the CP and SP can intercept the connection on the fly by observing the current protocol parameters in the active session (e.g., sequence numbers, advertised window, and so forth) and recreate the necessary protocol state within the proxy device along with the appropriate NAT rules to cause the connection to be intercepted midstream.

Connection Deflector

Figure 10:
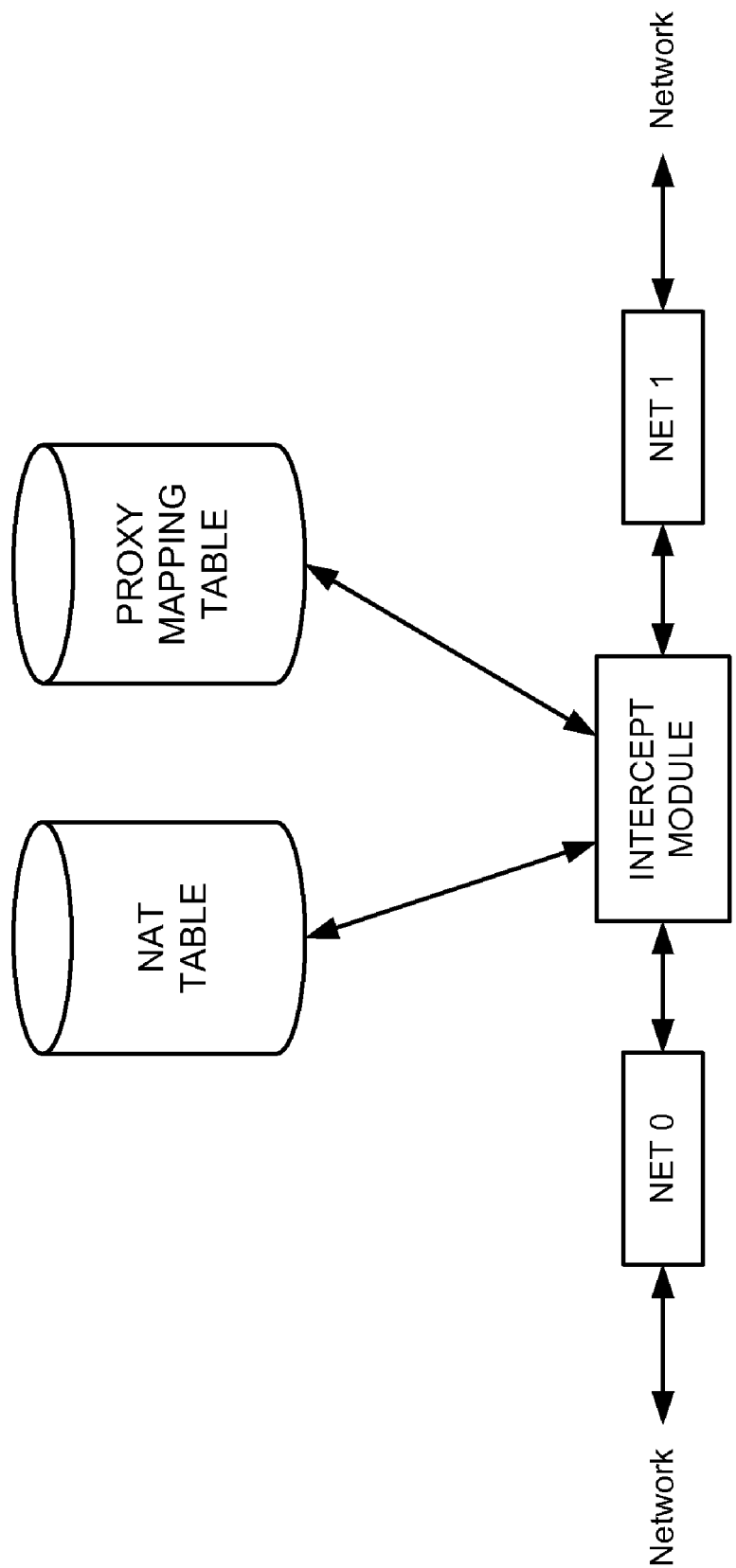
FIG. 10 is a diagram illustrating a connection deflector housing intercept and NAT functions in a stand-alone network device.

In another embodiment of the present invention, the intercept module and NAT and PMT tables are embodied in a network device that is separate from the proxy. FIG. 10 illustrates this arrangement, where the intercept and NAT functions are housed in a stand-alone network device called a "connection deflector". A connection deflector, in this form, is by itself a new type of network device that provides server-side transparency to a proxy configuration without placing the proxy device in the path between the client and server. Instead, the connection deflector is placed in the path and that device NATs packets to one or more proxies that are not in the path.

Figure 11:
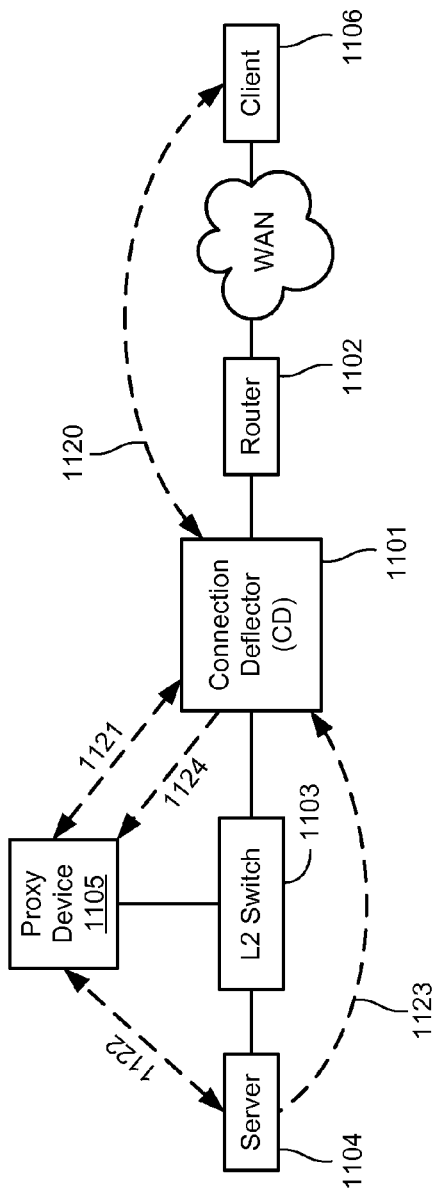
FIG. 11 is a diagram illustrating a connection deflector (CD) deployed to implement proxy interception in a manner that is fully transparent to a server.

A connection deflector may optionally include the logic described earlier for automatically populating entries in the PMT to perform proxy pair auto-discovery, but the device is also useful without this. In this simpler case, the PMT is populated with static entries, e.g., entered via user configuration. FIG. 11 illustrates how a single connection deflector (CD) 1101 is deployed to implement proxy interception in a manner that is fully transparent to the server. To do so, CD 1101 is situated in the path between a router 1102 and a layer-2 switch 1103. Attached to the switch are a proxy 1105 and a server 1104. The intercept module within CD 1101 forwards all packets between the switch and the router. When CD 1101 encounters a connection setup packet (e.g., a TCP SYN packet) from a client 1106 addressed to server 1104, it creates two NAT rules and installs these rules in its NAT table: a first rule causes the client-server flow in question to be directed toward proxy 1105 instead of server 1104, and a second rule causes packets sent from server 1104 to client 1106 on the return port to also be directed to proxy 1105 instead of the client. The proxy address for the NAT rule is determined from the PMT.

Optionally, when CD 1101 forwards the connection setup packet to proxy 1105, CD 1101 appends a message option in the connection setup packet to signal the server address to the proxy, thereby allowing the proxy to know that the client had initiated the connection to go to that particular destination. In turn, proxy 1105 terminates the transport connection from client 1106 and initiates a new transport connection 1122 to server 1104, but NATs the connection so the packets server 1104 receives over connection 1122 appear with a source address that corresponds to client 1106. As a consequence, server 1104 generates return packets addressed to the client rather than proxy 1105 along path 1123. These packets are thus delivered toward the client, through switch 1101 and CD 1105. At this point, the second NAT rule in CD 1101 mentioned above matches the packets and causes them to be transformed by NAT and directed to proxy 1105 along path 1124. Finally, proxy 1105 receives the packets and associates them to connection 1122 and processes them as if they had originated from the server and had originally been addressed to the proxy. Thus, proxy 1105 has successfully intercepted transport connection 1120 from client 1106 to server 1104 in a way that is completely transparent to server 11104.

A connection deflector is not limited to interoperating with a single proxy, single server, and single client as depicted in FIG. 11, but rather generalizes to support an arbitrary number of proxies, servers, and clients. By configuring different NAT rules for different servers and proxy combinations, an arbitrary number of entities are supported. Moreover, the proxies need not attach directly to the layer-2 switch but can be anywhere in the routed network. The only requirement is that the connection deflector be situated in both the forward and backward paths between the client and server so the traffic can be properly NAT'd in both directions.

Figure 12:
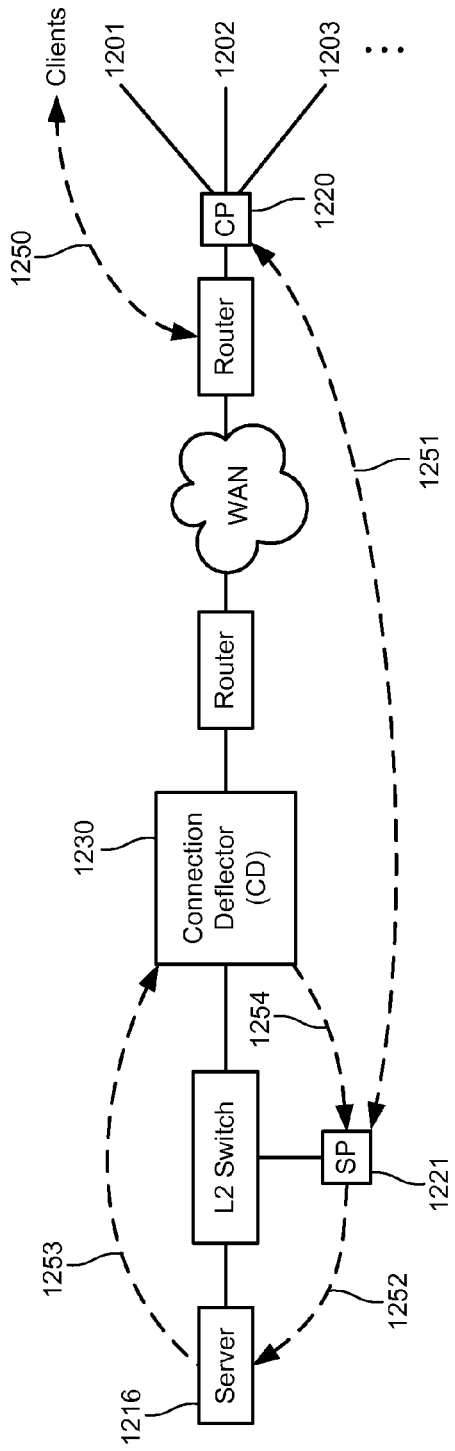
FIG. 12 is a diagram illustrating a client-side proxy (CP) and a server-side proxy (SP) situated with respect to a connection deflector.

In another embodiment, the connection deflector includes probing capabilities in the intercept module to perform proxy pair auto-discovery as described earlier. FIG. 12 shows how the client-side proxy (CP) and server-side proxy (SP) are situated with respect to the connection deflector. Here, CD 1230 is situated in the network data path but SP 1221 is situated out of path attached to a layer-2 switch. This separation is amenable to high performance implementation as it allows simple network functions like packet forwarding, NAT, probe generation and interpretation, and so forth to be implemented in a dedicated network device while higher-level proxy functions can be implemented in a general purpose computing device that is not in the critical path of the network.

In this configuration, the exchange of messages that perform proxy auto-discovery is modified because the CP and SP communicate with a non-transparent connection that does not need to be NAT'd. In fact, only one NAT rule per client-server session need be installed in the CD to handle the return path from the server to the client, as the forward path is transparently intercepted at the CP. Also, the CD and CP perform auto-discovery while the SP does not.

FIG. 12 shows one way to deploy a connection deflector to perform proxy pair auto-discovery. When client 1201 initiates a connection to server 1210, CP 1220 intercepts the connection request packet and appends a probe request option as described earlier. The connection request packet is intercepted by CD 1230, which in turn, responds to the probe providing the address of SP 1221 as the contact point. At the same time, CD 1230 installs a NAT rule that causes traffic sent from server 1210 to client 1201 on the return port of the connection in question to be diverted via NAT to SP 1221. CP 1220 then terminates the client connection 1250, initiates a new connection (or virtual connection) 1251 to SP 1221. Next, SP 1221 initiates a connection 1252 to server 1216 on behalf of CP 1220 and NATs the source address so that server 1216 believes the incoming connection is arriving from CP 1220 even though the connection originates from SP 1221. Thus, the return packets from server 1210 corresponding to connection 1252 follow path 1253 toward client 1201. When the packets reach CD 1230, the newly installed NAT rule matches the packets and causes them to be NAT'd and diverted back to SP 1221. Thus, the CP, SP, and CD successfully discovered the presence of one another and intercepted the client/server connection, without having the SP in the network path and while maintaining strict transparency for the server.

Clustering and Load Balancing

The configuration of FIG. 12 can be generalized with multiple SPs at the server site to support clustering and load balancing. Suppose there are N SPs instead of just one. Then, CD 1230 could select one of the N and return the address of the selected SP to the CP in a probe response packet. The selection could be based on availability, load, and so forth. Or, preferably, CD 1230 could return a list of available SPs to CP 1220 in the probe response packet. This would allow CP 1220 to store the list in its PMT and select an SP using its own discretion. For example, it might favor one primary device over other secondary devices and only use secondary devices when the primary device is unavailable or near capacity. Depending on the particular functions the proxy performs, such a policy could enhance the performance of proxy pairs since the same pairs will tend to be used consistently over time. Another approach is to have the CP employ a consistent hash (e.g., as a function of the server and client addresses) so that the same client-server sessions are consistently mapped onto the same SP, again enhancing the performance of the proxy end points.

Variations

Figure 13:
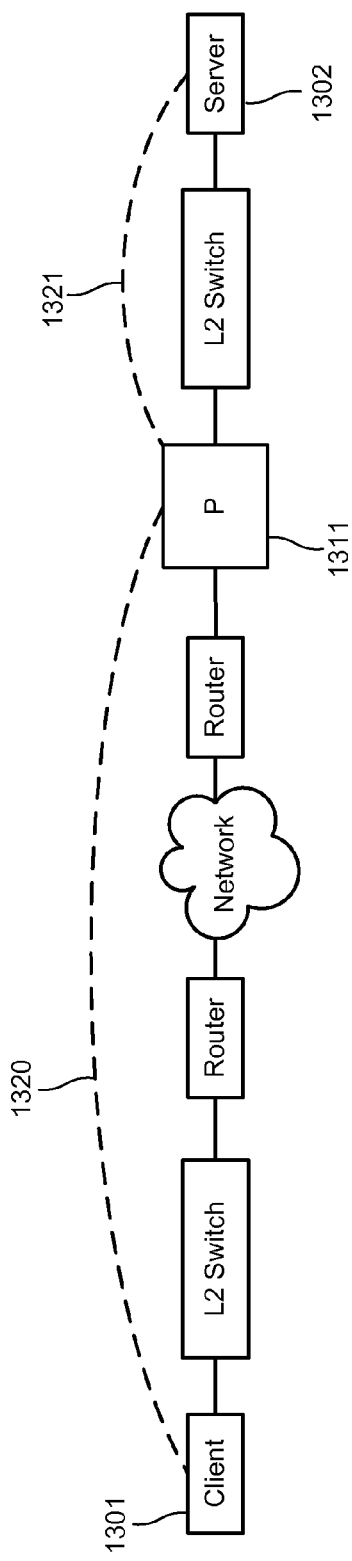
FIG. 13 illustrates a variation of a proxy device, where a single proxy intercepts client connections and server connections, but interacts with each using the other's address.

FIG. 13 illustrates a variation that is useful beyond autodiscovery of proxy pairs and can be used with an unpaired proxy. In this variation, a single proxy 1311 is situated in a path between the client 1301 and the server 1302 such that all traffic along the forward path from client 1301 to server 1302 flows through proxy 1311 and all traffic along the reverse path from server 1302 to client 1301 flows through proxy 1311.

When client 1301 initiates a connection 1320 to server 1302, proxy 1311 intercepts the client packets and terminates the connection within that device even though the packets comprising the connection are addressed to server 1302. In addition, all packets that originate from proxy 1311 as part of connection 1320 are assigned a source address that corresponds to the address of server 1302. Thus, client 1301 appears to itself to be communicating directly with server 1302 even though connection 1320 is terminated at proxy 1311. When proxy 1311 successfully establishes connection 1320, it establishes another connection 1321 with server 1302, whereby it assigns a source address to all packets it originates on connection 1321 with the address of client 1301. Thus, server 1302 appears to itself to be communicating directly with client 1301 even though connection 1321 is terminated at proxy 1311.

Once the connections have been established, messages can be transmitted between the client and server in either direction through the proxy intermediary, which can perform the arbitrary transformations on the connection data as described herein and elsewhere.

Figure 14:
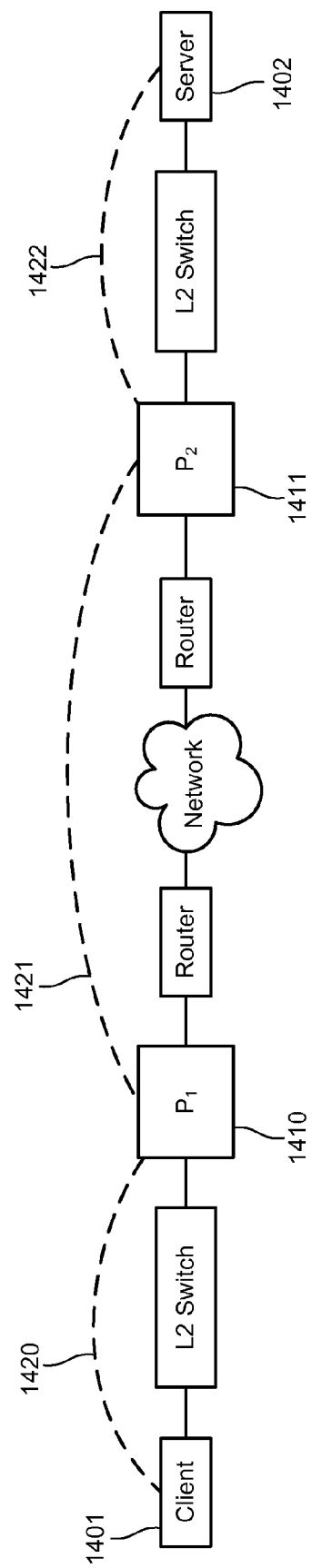
FIG. 14 illustrates another variation, wherein a pair of proxy devices are used as shown in FIG. 13.

FIG. 14 illustrates the variation of FIG. 13 with a pair of proxies instead of a single proxy. In the example shown there, a proxy 1411 and another proxy 1410 are situated in path between the client 1401 and the server 1402 such that all traffic along the forward path from client 1401 to server 1402 flows through proxy 1410 and all traffic along the reverse path from server 1402 toward client 1401 flows through proxy 1411. When client 1401 initiates a connection 1420 to server 1402, proxy 1410 intercepts the client packets and terminates the connection within that device even though the packets comprising said connection are addressed to server 1402. In addition, all packets that originate from proxy 1410 as part of connection 1420 are assigned a source address that corresponds to the address of server 1402. Thus, client 1401 appears to be communicating directly with server 1402 even though connection 1420 is terminated at proxy 1410. Proxy 1410 then opens another connection 1421 to proxy 1411. Alternatively, proxy 1410 could re-use an existing connection between proxy 1410 and proxy 1411 and implement connection multiplexing as described earlier. When proxy 1410 and proxy 1411 successfully establishes connection 1421, proxy 1411 establishes another connection 1422 with server 1402, whereby it assigns a source address to all packets it originates on connection 1422 with the address of client 1401. Thus, server 1402 appears to be communicating directly with client 1401 even though connection 1422 is terminated at proxy 1411.

Once the connections have been established, messages can be transmitted between the client and server in either direction through the proxy intermediaries, which can perform the arbitrary transformations on the connection data as described herein and elsewhere.

User Affinities

"User affinity", as the term is used herein, refers to an association with an end user in a computer system or network. Thus, data with a user affinity is intrinsically tied to that user, or in some cases, to one or more users. For example, an e-mail addressed to a user "John Doe" would have a user affinity for that user. Likewise, a file on a file server that is owned by "John Doe" would have a user affinity for that user. More generally, a file that is accessed by multiple users in a distributed setting would have user affinities for each such user.

User affinities can be used advantageously in optimizing data delivery. In a common approach, as described above, multiple servers might be set up in a distributed manner to hold user data, such as e-mails, files, etc., near the users for that data. However, this has the disadvantages that servers are distributed and more difficult to maintain, etc.

This can be overcome by several inventive methods and apparatus. Two examples, and some variations, are described here.

Using Dynamic Location Information Stores to Route Data Having User Affinity

In one approach, data stored on a server is selectively copied to caches nearer to clients, wherein the selectivity is based on user affinity of the copied data and probable locations of users determined from dynamic user location information. One specific example that will be described is an e-mail content delivery system, wherein the user affinity of a given e-mail message might be based on the intended recipients of the e-mail message and dynamic user location information might be determined from previous interactions of user is using clients that are coupled to the e-mail content delivery system.

Figure 15:
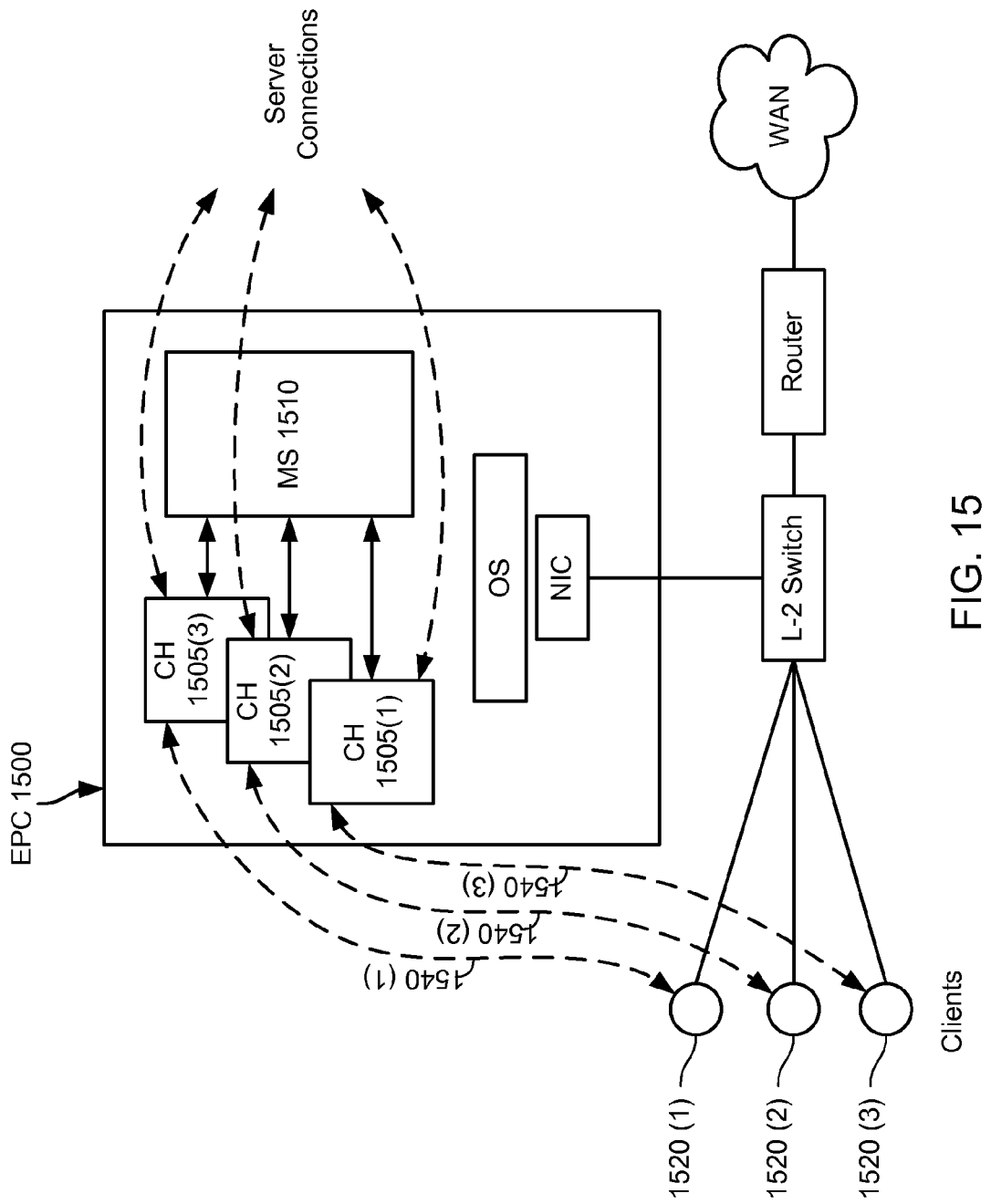
FIG. 15 is a block diagram of one embodiment of a proxy device according to the present invention, in this example being an e-mail proxy device (EPD).

FIG. 15 illustrates one example of such an e-mail content delivery system. As shown there, an e-mail proxy cache (EPC) 1500 is located on a network near the users in a remote location. EPC 1500 optimizes performance of communications between the clients used by the users to centralized e-mail servers over a WAN. EPC 1500 attaches to the network through one or more network interface card (NIC) and comprises mechanisms for terminating and optionally intercepting client connections, a message store to hold copies of e-mail messages, and connection handlers to terminate and initiate e-mail transport connections between client and server.

EPC 1500 is shown including connection handlers 1505, a message store 1510, clients 1520 and client connections 1540 between clients 1520 and connection handlers 1505. Where multiple instances of similar items are present in the figures, they are denoted with a common reference number and distinct instances are represented with a distinct parentheticals. Thus, FIG. 15 shows three connection handlers 1505(1), 1505(2), 1505(3). It should be understood that while these examples show three clients and three connection handlers, fewer or more clients might be present and fewer or more connection handlers might be present (and not necessarily the same number of connection handlers at the number of clients).

Connection handlers 1505 (and portions of EPC 1500) might be software processes running on a computer system attached to the network through an NIC connected to a layer-2 switch. EPC 1500 assigned a network address (e.g., an Internet Protocol, or IP, address). Each connection handler (CH) 1505 terminates a client session and initiates one or more server connections on behalf of the corresponding client 1520. For example, client 1520(1) communicates with CH 1505(1) over connection 1540(1). Connection handlers 1505 store and retrieve copies of e-mail message data in message store 1510.

When deployed in this fashion, clients attached to a LAN communicate with EPC 1500 rather than the origin server directly, e.g., by using the EPC's IP address instead of the server's address. This can provide some benefits, but further improvements are possible, as the approach is shown in FIG. 15 is often difficult to achieve when e-mail protocols and clients do not readily support such a configuration.

Figure 16:
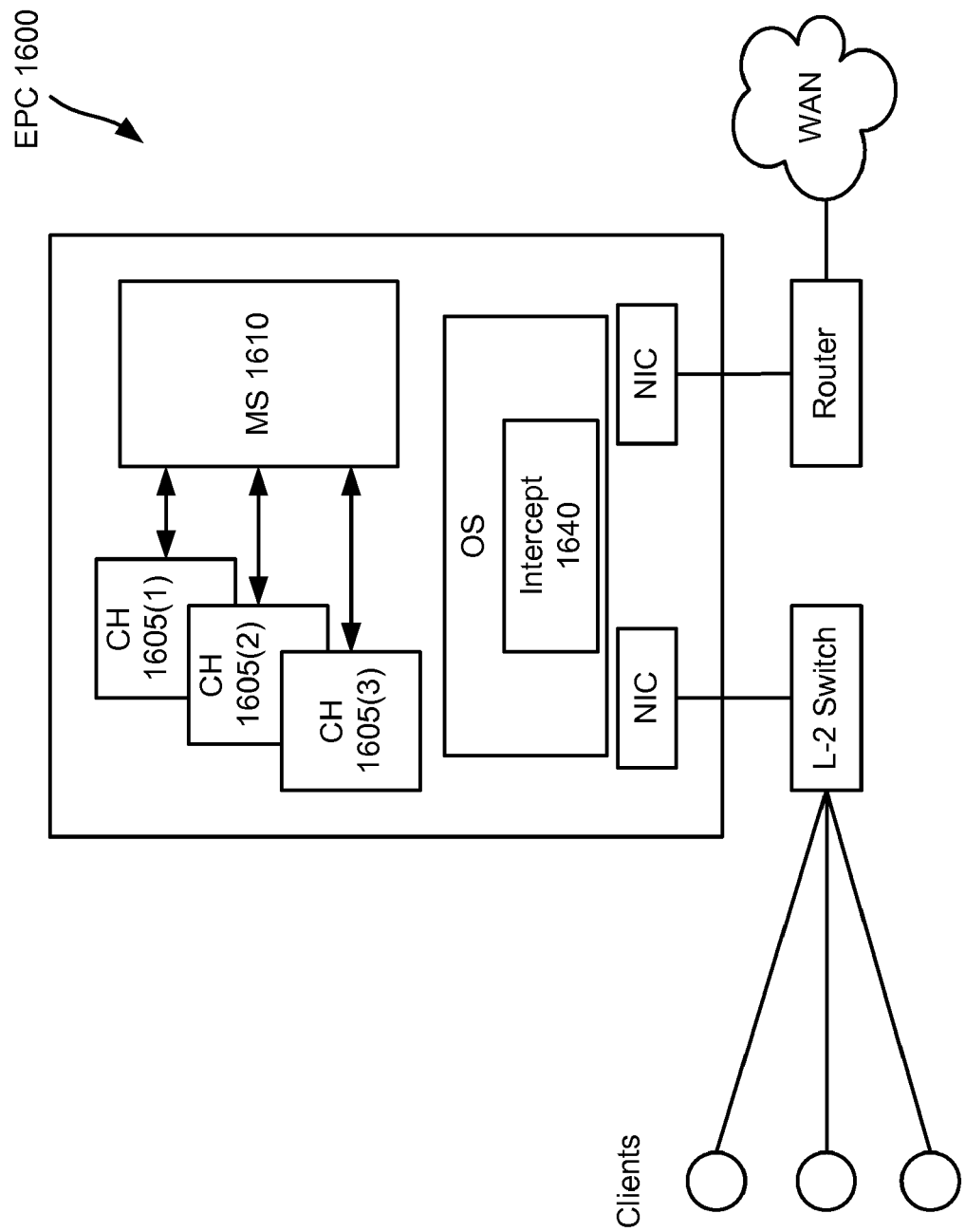
FIG. 16 is a block diagram of a proxy device according to the present invention, implemented as a dual-port NIC device.

An improved embodiment is illustrated in FIG. 16, where an EPC 1600 includes a dual-port NIC and can be inserted in the network path between the layer-2 switch and the router, and further includes connection handlers 1605 (or mechanisms to instantiate connection handlers 1605 as needed) and a message store 1610. This arrangement allows the EPC to transparently intercept and proxy connections, such as according to the methods described in McCanne IV. In this embodiment, the EPC 1600 acts as a layer-2 relay or bridge for all traffic that it does not proxy. For connections that it does proxy, EPC 1600 intercepts the corresponding traffic in an intercept module 1640 and directs intercepted traffic to an appropriate connection handler 1605 within EPC 1600.

In this embodiment, client connections to the e-mail servers are terminated by EPC 1600, much like a Web cache terminates connections. A connection handler is preferably created for each client session and a corresponding connection is established with the e-mail server targeted by the client. When an e-mail client retrieves a message from the server, EPC 1600 inspects its message store 1610 to see if the message is already present and, if so, returns it. Otherwise, EPC 1600 fetches the message from the origin mail server, stores the message in message store 1610, and transmits the message to the e-mail client.

Replicating e-mail in this fashion is a straightforward task as e-mail protocols typically assign a unique identifier to every e-mail message and messages are not alterable. Thus, there is no consistency problem to solve since a copy of an e-mail message is effectively the same as the original message. In other words, if the EPC can locate a message in its message store using the unique identifier of that message, then it knows that copy of the message is always valid.

Figure 17:
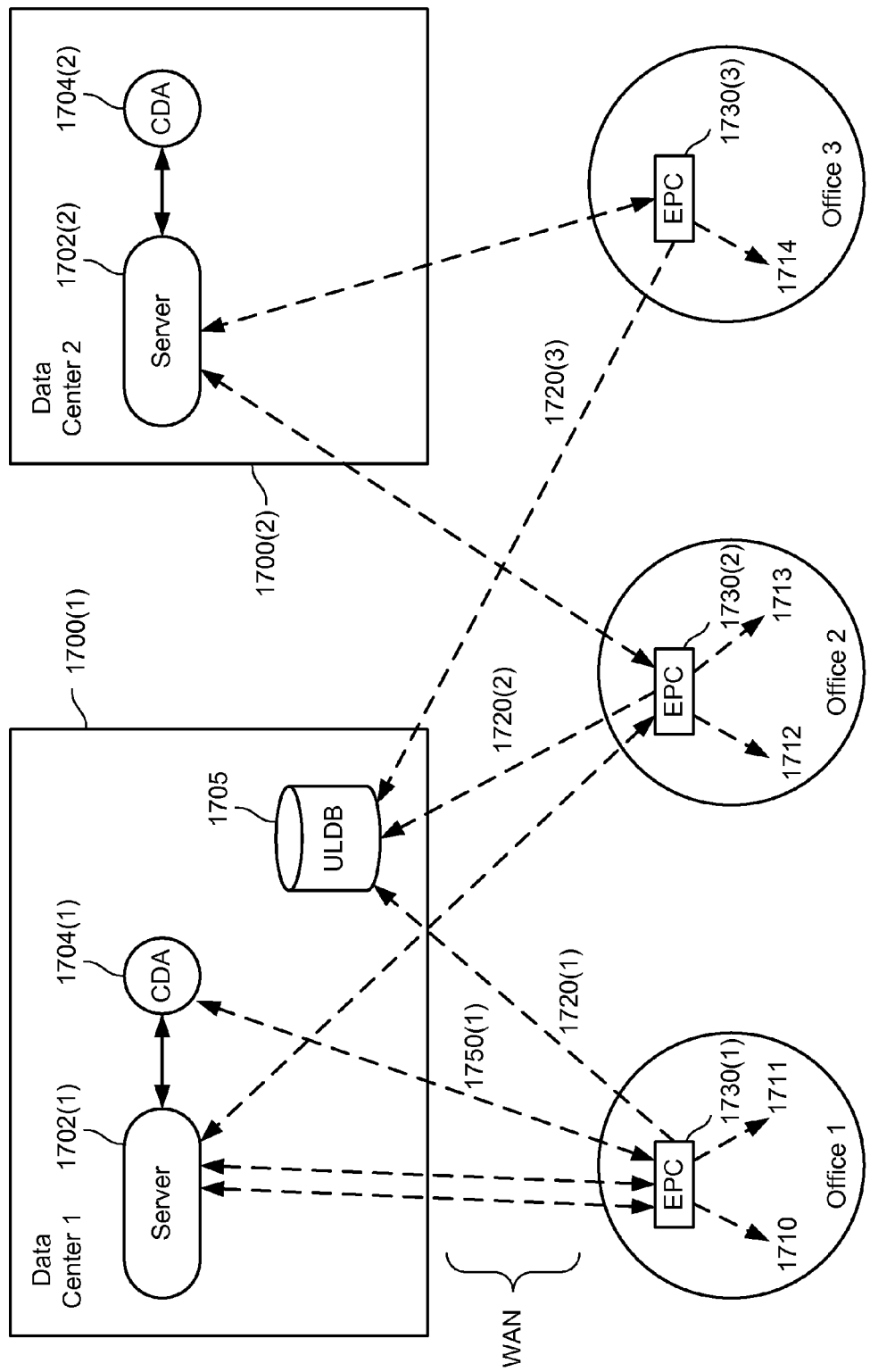
FIG. 17 is a diagram illustrating an arrangement of content delivery agents (CDAs), user location databases (ULDBs) usable for delivery of data in advance of requests for that data to locations network near to users likely to be requesting that data.

FIG. 17 illustrates a content delivery system further comprising content delivery agents (CDAs) deployed at or near the servers. A content delivery agent for an e-mail server pre-loads an e-mail proxy cache (EPC) with messages for users that are determined to be near that EPC. When new mail messages arrive at a server, the content delivery agent for that server inspects the message to determine the recipient(s) of the message. The content delivery agent then determines which EPC is nearest the recipient(s). This user location determination could be made in a number of ways, as described below. Once the appropriate EPC has been determined, the content delivery agent forwards a copy of the message to the selected EPC for storage in that EPC's message store. When the user then fetches the message, the EPC serves the message from its message store and the resulting performance is high. One method for user location determination involves consulting a database maintained by a system operator. Alternatively, the determination could be made by consulting a database that is automatically built from dynamic observations of where users read their e-mail.

In one particular example, FIG. 17 illustrates two data centers 1700(1) and 1700(2) operating e-mail servers 1702(1) and 1702(2) respectively. As shown, each data center 1700 also includes a CDA 1704. Data center 1700(1) is also shown including a user location database (ULDB) 1705. It should be understood that the number of the data centers, e-mail servers, content delivery agents, clients and EPCs need not be identical to that shown FIG. 17. For example, a single e-mail server might be used or more than two e-mail servers might be used.

Clients 1710, 1711, 1712, 1713, and 1714 are accessing e-mail via over the WAN. Each client communicates with one of the two e-mail servers 1702 through a connection proxied by that client's local EPC 1730. Associated with each e-mail server is a content delivery agent (CDA) 1704. The CDA may be software running on the same computer as the e-mail server and interfacing with said server through an API, or it may be a device running on a computer attached to a network coincident with the e-mail server and interfacing with the e-mail server through a network protocol or an API on top of a network protocol.

As messages are retrieved by clients at various locations through their nearby EPC, each EPC records the fact that a user is retrieving e-mail from that location and transmits a message to ULDB 1705 indicating a mapping between that user and that location (e.g., the location of that EPC). For example, EPC 1730(1) transmits this information over connection 1720(1). The message might contain user identification (i.e., a login name, user ID, etc.) as well as a location identifier (e.g., the IP address of the EPC through which the user is retrieving messages, etc.). The messages to the ULDB can be batched together and sent to at a configurable maximum rate to allow the system to scale without degrading performance.

Using this information, over time the ULDB learns the locations of the various users. As a consequence, when a new message arrives for a particular user, the CDA of the receiving server can pre-load that message into the message store of the EPC near that user as determined by the dynamic location information. For example, when an e-mail arrives for user 1710 at server 1702(1), CDA 1704(1) delivers a copy of that message to EPC 1730(1) over connection 1750(1). If the ULDB indicates that the user accesses e-mail different locations serviced by different EPCs, the CDA can send a copy to each of the EPCs likely to service that user.

Figure 18:
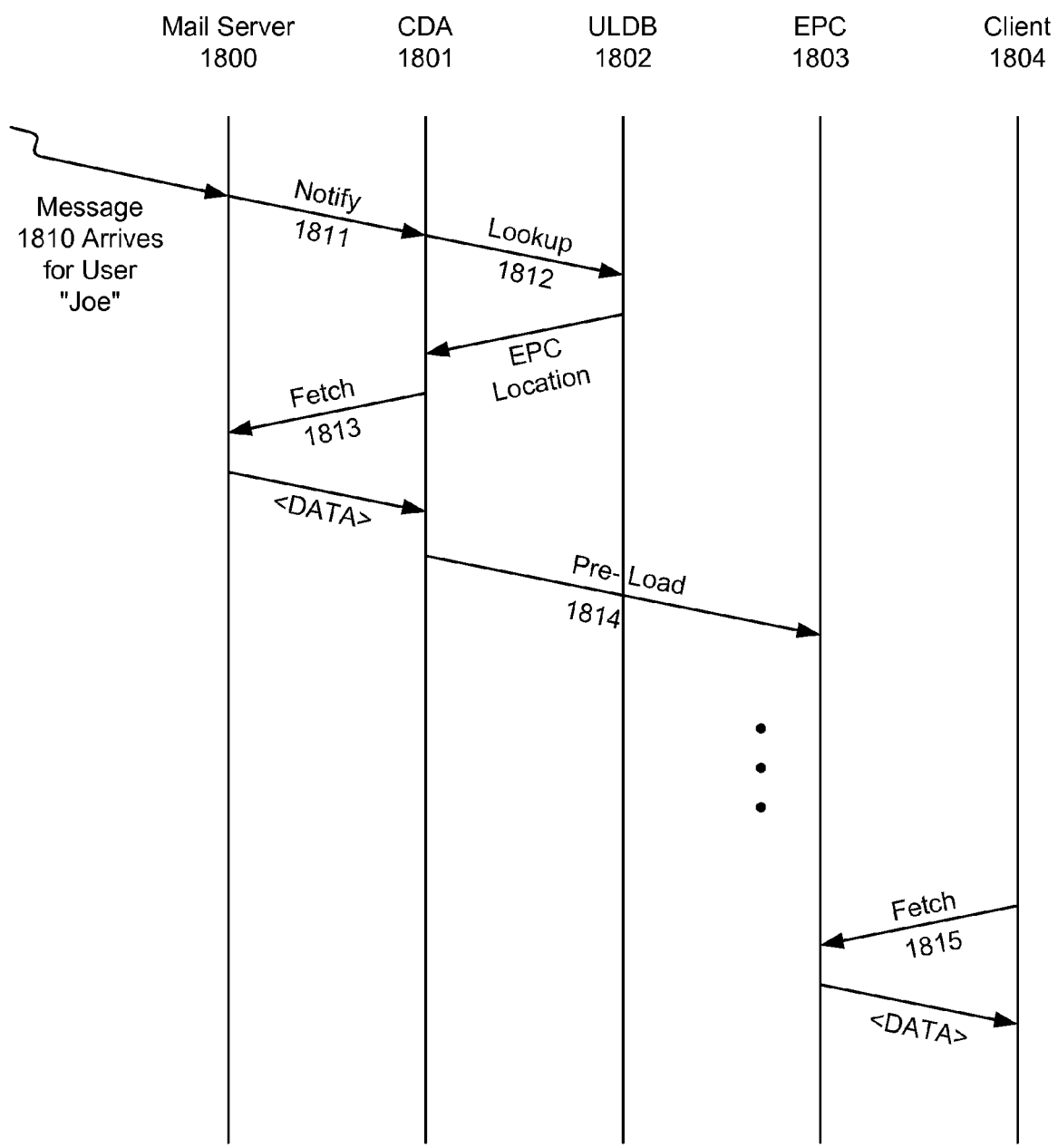
FIG. 18 is a swim diagram illustrating a process of e-mail delivery using an arrangement such as that shown in FIG. 17.

FIG. 18 shows a swim diagram of the delivery of an example message for a particular user. In this example, a message 1810 arrives from the Internet at mail server 1800. The mail server sends a "notify" message 1811 to the CDA 1801 indicating the arrival of the message for user "joe". CDA 1801 in turn sends a lookup message 1812 for user "joe" to ULDB 1802, which responds with the location of device EPC

1803. CDA 1801 sends a "fetch" message 1813 to mail server 1800 to retrieve the message data (and any attachments) from message 1810. Once the data is received, CDA 1801 transmits the data in a "pre-load" message 1814 sent to EPC 1803. Later, when the user attempts to read the message through e-mail client 1804, the client transmits a "fetch" message 1815 to the server to requesting the contents of message 1810. Subsequently, EPC 1803 intercepts message 1815 and serves the corresponding data from its local message store to the client, thereby achieving high delivery performance.

Using Connection End-Point Proxies to Deliver Data Based on User Affinities

The above approach improves over existing solutions, but does require deploying and administering a content delivery agent associated with each server, which can be difficult and expensive for enterprise IT organizations. Additionally, this approach may involve several interdependent components that require integration with a number of different protocols, application programming interfaces (APIs), intercommunicating agents, and so forth.

An alternate approach will now be described, wherein content is delivered based on user affinities using connection end-point proxies. As the term is used herein, a connection end-point proxy (CEP) is a proxy agent embedded in some device or otherwise attached to a network that sustains client-server sessions after the client has terminated its server connection so that the connection can be used for proxy-initiated content delivery.

When a client attempts to terminate a connection representing a client-server session, the CEP intercepts of the determination and maintains the session, thereby inheriting the client session. Because the CEP inherits the client session, it also inherits all the security and access capabilities of that session. The CEP thus can inject synthetic transactions into the client-server session that cause message data, attachments, and so forth to be retrieved from the server into a local proxy. Even if the client terminates its session, the CEP can retain the client connection, continue to monitor the client's message store, and retrieve messages and corresponding data as they arrive for that user from the server into the CEP. When a client opens a new session with the server in question, the CEP tears down the previously sustained session then allows the new session to be established. In a configuration where a server-side proxy exists in addition to a CEP running at a client-side proxy, an agent at the server-side can note when a second user session is established and tear down any CEP connections that had been sustained beyond the termination of the client connection.

CEPs can be interposed in the path of client-server connections by deploying within a network proxy device. A proxy device that houses a set of CEPs, one for each connection being proxied, is called a connection end-point proxy device (CEPD) herein.

Figure 19:
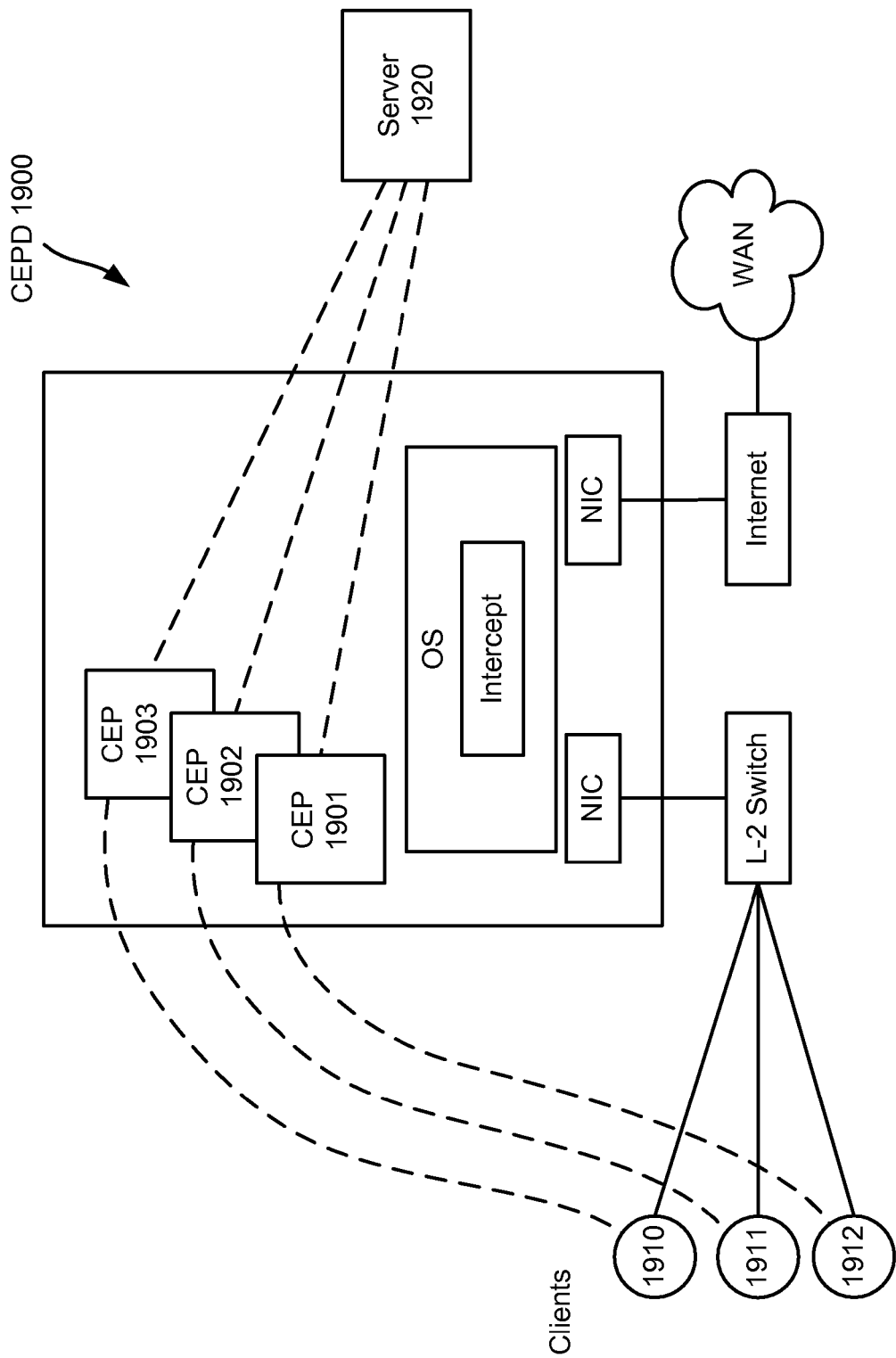
FIG. 19 is a diagram illustrating connections that are proxied through a connection end-point proxy (CEP).

FIG. 19 illustrates a CEPD, which attaches to a network through one or more network interfaces. In this case, the preferred configuration of two NICs is shown. A number of clients (1910, 1911, 1912) have connections to server 1920 that are proxied through CEPs 1903, 1902, and 1901 respectively.

Figure 20:
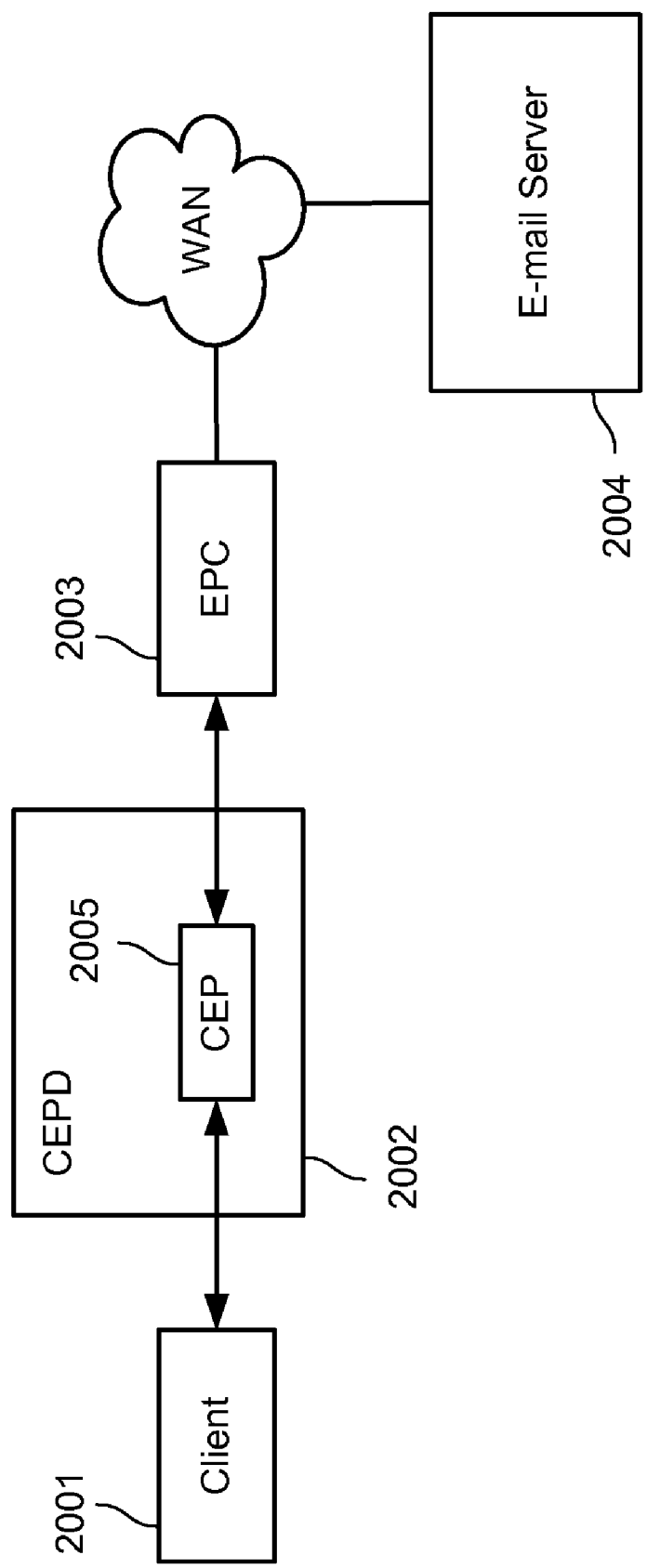
FIG. 20 illustrates one embodiment of a content delivery system wherein a connection end-point proxy device (CEPD) integrates with an e-mail proxy cache (EPC).

FIG. 20 illustrates one embodiment of a content delivery system wherein a connection end-point proxy device (CEPD) integrates with an e-mail proxy cache (EPC). As shown there, client 2001 initiates one or more transport connections to server 2004 to retrieve, process, examine, etc., e-mail messages or messages of other types such as calendar data, newsgroups, shared files, etc.

In some cases, the protocol that client 2001 uses to access the e-mail server may be a standardized protocol such as IMAP or a proprietary protocol such as MAPI. IMAP is described in M. Crispin, "Internet Message Access Protocol—Version 4rev1", Request-for-Comments (RFC) 2060, December 1996. MAPI is Microsoft's proprietary protocol Messaging API (MAPI), which runs over Microsoft's Remote Procedure Call (RPC) protocol. In such an embodiment, the client's IMAP or MAPI connection(s) would be transparently intercepted by CEPD 2002, which terminates the IMAP/MAPI connection(s) at CEP 2005, and initiates a corresponding transport connection (or set of connections) with the origin e-mail server 2004. The e-mail proxy 2003 in turn intercepts the connection(s) initiated from the CEPD 2002, and subsequently initiates a corresponding transport connection (or set of connections) with the origin e-mail server 2004.

Once this pipeline of transport connections is established, messages from the client are relayed over the various connections comprising the pipeline to the server, while responses from the server are relayed back to the client. At the start of the connection, the client might be authenticated through various mechanisms that exchange messages back and forth. Once the client has been authenticated, the CEP 2005 is free to perform content delivery by injecting synthetic messages into the client-server session. For example, e-mail clients typically fetch all of the headers for display to the user. Then, only after the user attempts to display and read a message does the client fetch the message. Moreover, e-mail messages often contain large attachments that are likewise only fetched when the user attempts to open or download the attachment. To improve the user experience, a CEP can proactively scan the contents of a user's mailbox and fetch message and attachment data before they are requested by the user. Alternatively, the CEP can watch as headers are retrieved and inject synthetic messages to requesting the corresponding message text and attachment data.

Figure 21:
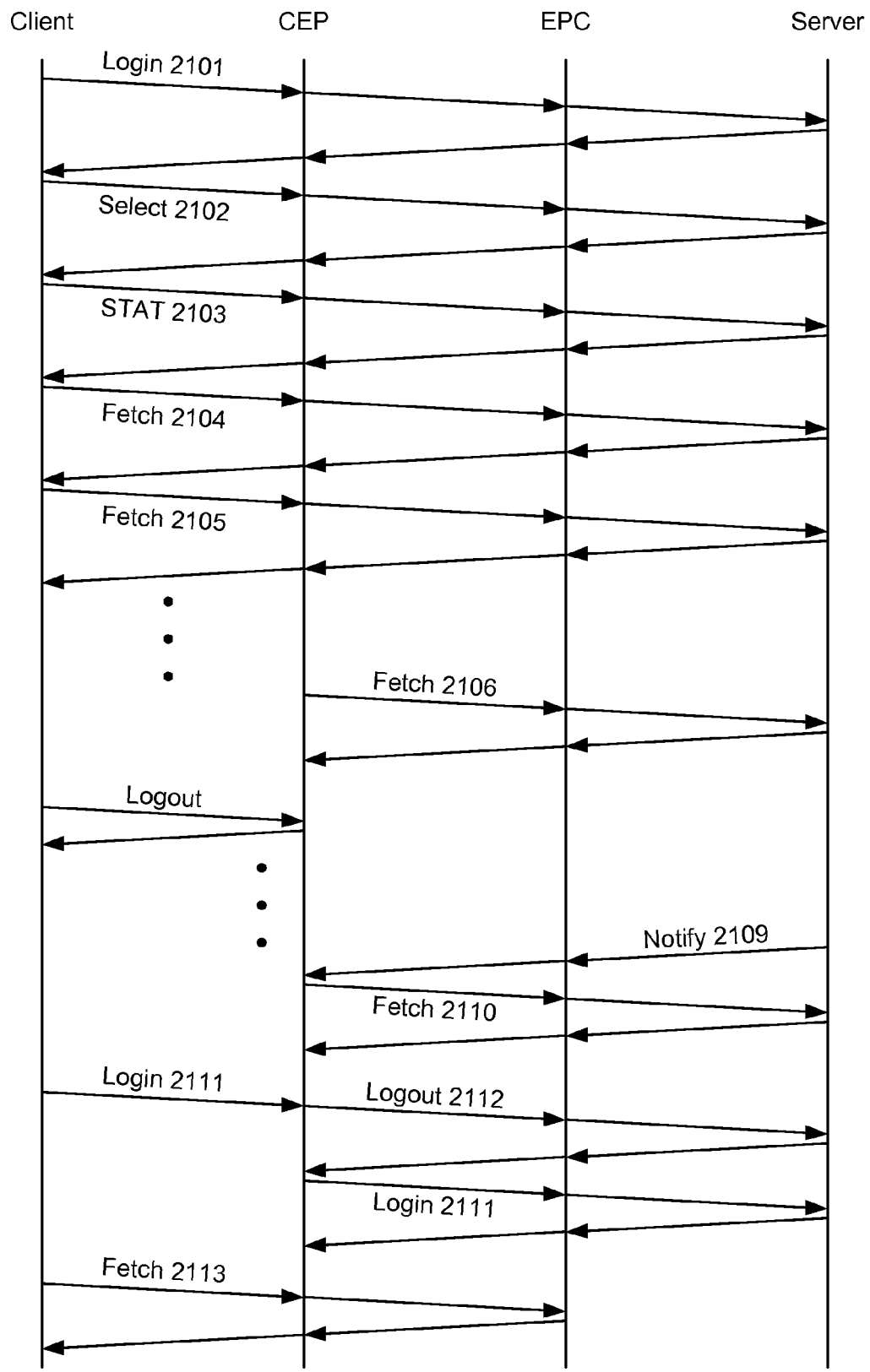
FIG. 21 is a swim diagram illustrating one example of how a content delivery function might be performed on top of normal e-mail messaging protocols.

FIG. 21 is a swim diagram illustrating one example of how the content delivery function might be performed on top of normal e-mail messaging protocols. In this example, the IMAP protocol is assumed.

In the illustrated example, the client first establishes its session with the e-mail server with "login" request 2101, including appropriate authentication information in the login message. Once the client has authenticated itself, it then issues "select" request 2102 to specify that subsequent operations are to be performed against a particular mailbox, for instance, the user's "inbox". Next, the client issues "stat" request 2103 to learn various information including whether new messages are present. The client then issues subsequent "fetch" commands (2104 and 2105) to retrieve message data in response to the user reading and display messages. Then, in this example, the user goes idle and does not read any subsequent messages, even though they exist in the mailbox. At this time, the CEP detects that the session is idle and transmits a synthetic "fetch" request 2106 for other messages that are in the user's Inbox but have not been retrieved. This causes the e-mail proxy cache to store the messages in its mail store. Later, when the user reads these messages by sending "fetch" requests, the messages are transmitted with high performance across the LAN from the e-mail proxy cache to the client.

Later, the user quits the e-mail client, which causes the client connection to terminate. However, instead of tearing down the connection through the e-mail proxy cache to the server, the CEP sustains the connection and continues to monitor the data source for that user within the e-mail server. For example, when new e-mail messages arrive for that user, the server transmits a "notify" message 2109 toward the client, which is intercepted and consumed by the CEP. In response, the CEP retrieves the data corresponding to the message body and attachments of the newly arrived e-mail by sending "fetch" request 2110. Thus, the e-mail proxy cache is continually filled with data that represents the e-mail content of the user's session without the need to explicitly build a database that maps users to locations.

Now suppose the user restarts the e-mail client, opens a connection to the e-mail server and transmits a new "login" request 2111 to establish the session. At this point, the CEP takes note that the user is establishing a new session, so it tears down the old session by sending a "logout" request 2112 to the server on the old connection, closes that connection, then allows the client's "login" request to continue on toward the server on the new connection. The client then attempts to retrieve messages that had previously been retrieved by the CEP into the e-mail proxy cache via "fetch" request 2113. As such, they are delivered with high performance as they are served from the e-mail proxy cache across the LAN.

Figure 22:
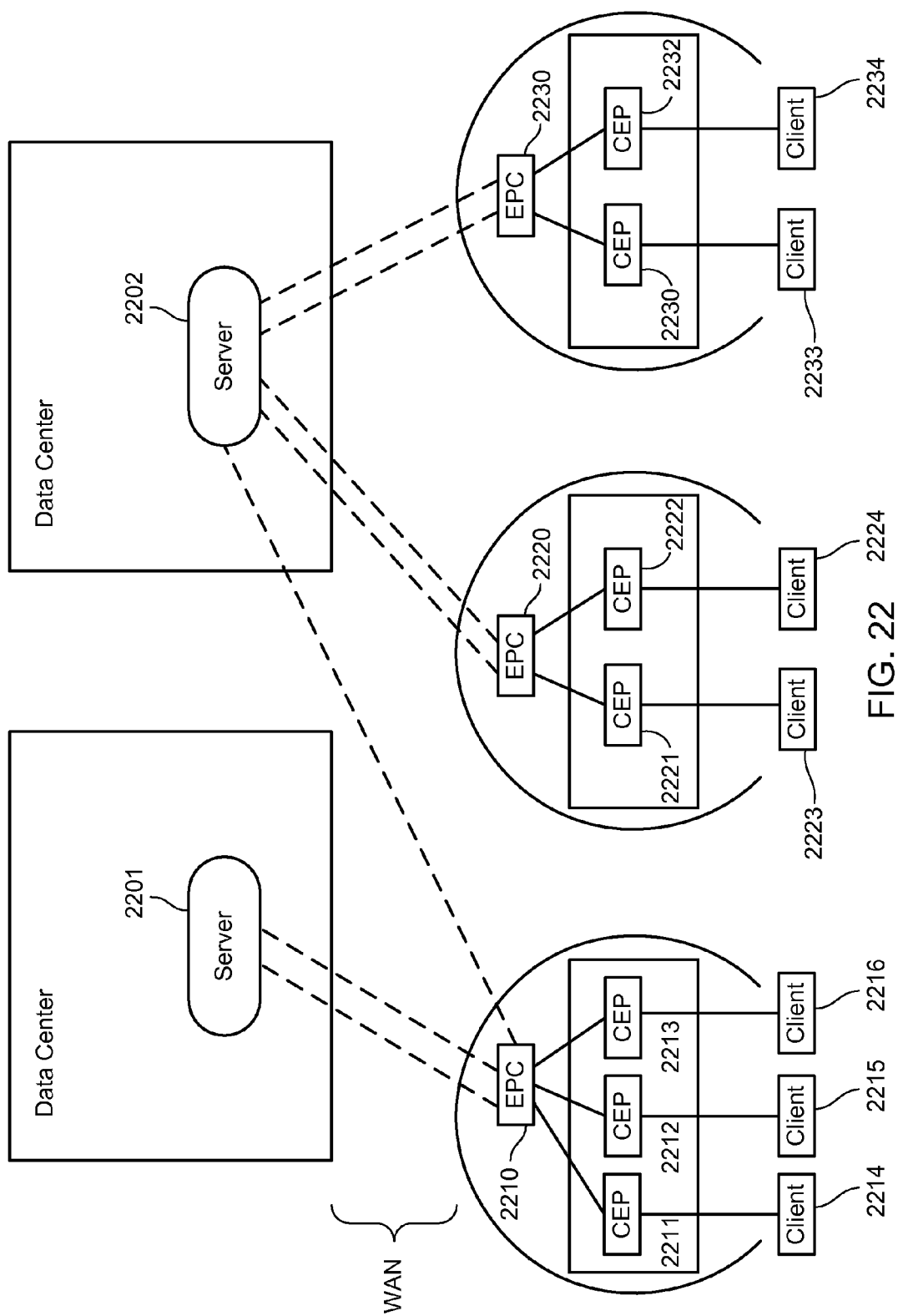
FIG. 22 is a diagram illustrating an arrangement of connection end-point proxies (CEPs) and e-mail proxy caches (EPCs) in a distributed enterprise.

FIG. 22 illustrates how some of the above the teachings can be generalized and deployed across a distributed enterprise with multiple locations. In the illustrated example, there are two servers, server 2201 and server 2202, in two data centers. In one office, are three clients 2214, 2215, 2216, a CEP for each client (2211, 2212, 2213) and an EPC 2210. Likewise, there are other clients, CEPs, and EPCs at other offices. Each client retrieves its messages from one of the two servers. As clients come and go, a CEP remains to represent the user's e-mail client. Thus, as new messages arrive, the CEP continually copies them down to the local site along the persistent connection to the corresponding e-mail server. For example, since client 2214 retrieves its messages from server 2202, CEP 2211 will automatically fetch all messages from server 2202 and pre-load them into EPC 2210 even when the connection from client 2214 is not present.

In effect, the ensemble of persistent connections terminated at EPCs forms a user-centric content delivery network from servers to user locations that delivers content over the native client-server connections. Thus, user location is implied by the connection fabric and need not be collected and explicitly stored in some sort of database.

Figure 23:
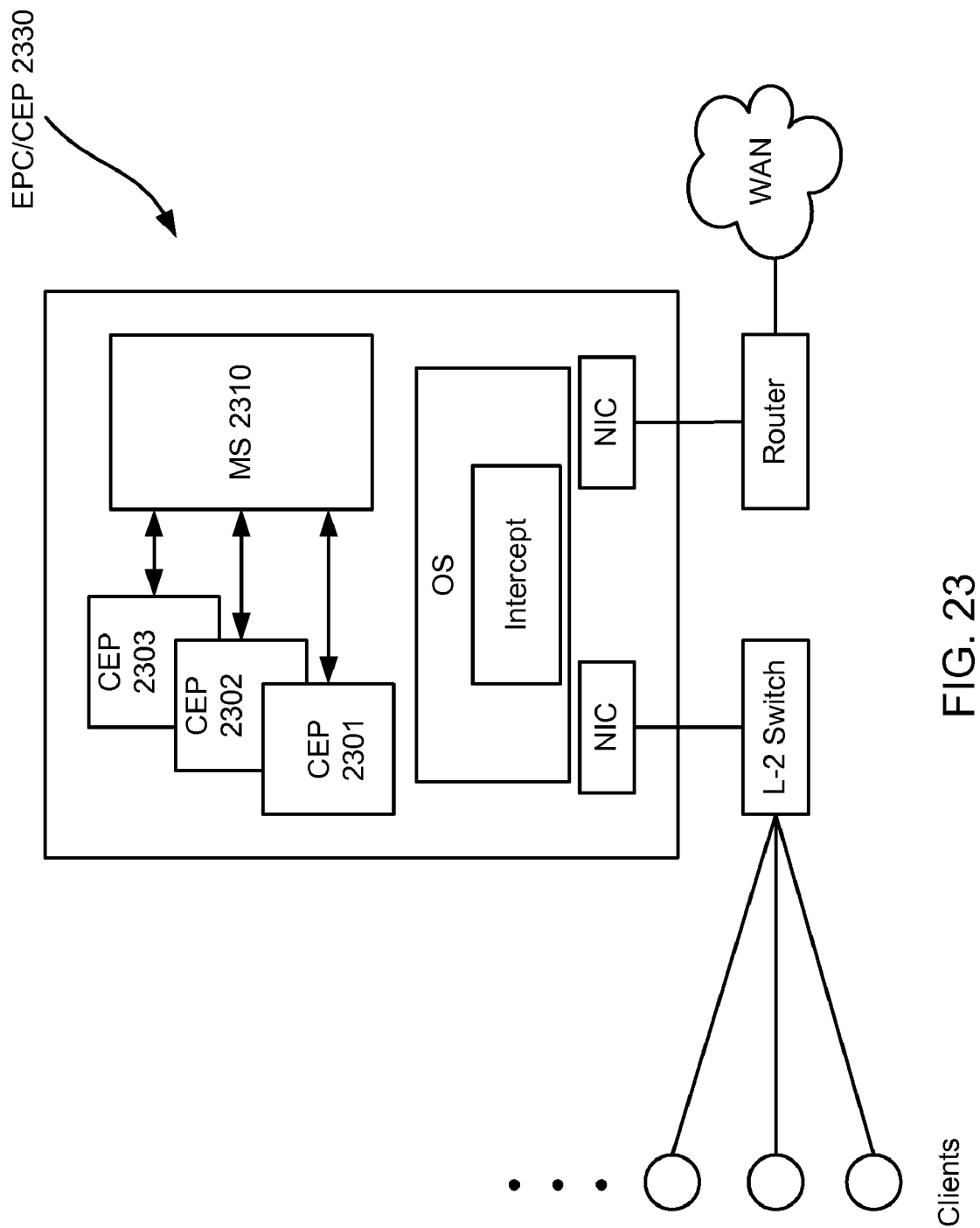
FIG. 23 illustrates one embodiment of an integrated EPC and CEP device including a dual-port NIC device.

In another embodiment of the present invention, the EPC and CEP functions are integrated into one process and there is no need for a CEPD to contain the CEP entities. In such embodiments, the CEP implements the proxy end-points and interacts with the message store directly. When a client terminates its session, the CEP sustains the server session as described above. FIG. 23 illustrates one example of this. As shown, the CEP integrates its functionality into the EPC and directly terminates the client and server transport connections.

In another embodiment, CEPs can be configured into a transaction accelerator and segmentation system as described in McCanne III, McCanne I, optionally using hierarchical segmentation as described in McCanne II, and transport connection interception and auto-configuration as described in McCanne IV. Moreover, CEPs can be used to effect content delivery for any user-affinity-based protocol, not just e-mail. This is facilitated by the fact that the segmentation and transaction acceleration scheme described in McCanne I is protocol and application independent. That is, unlike the EPC described above, transaction acceleration using segmentation works for many different protocols and applications, not just e-mail.

Figure 24:
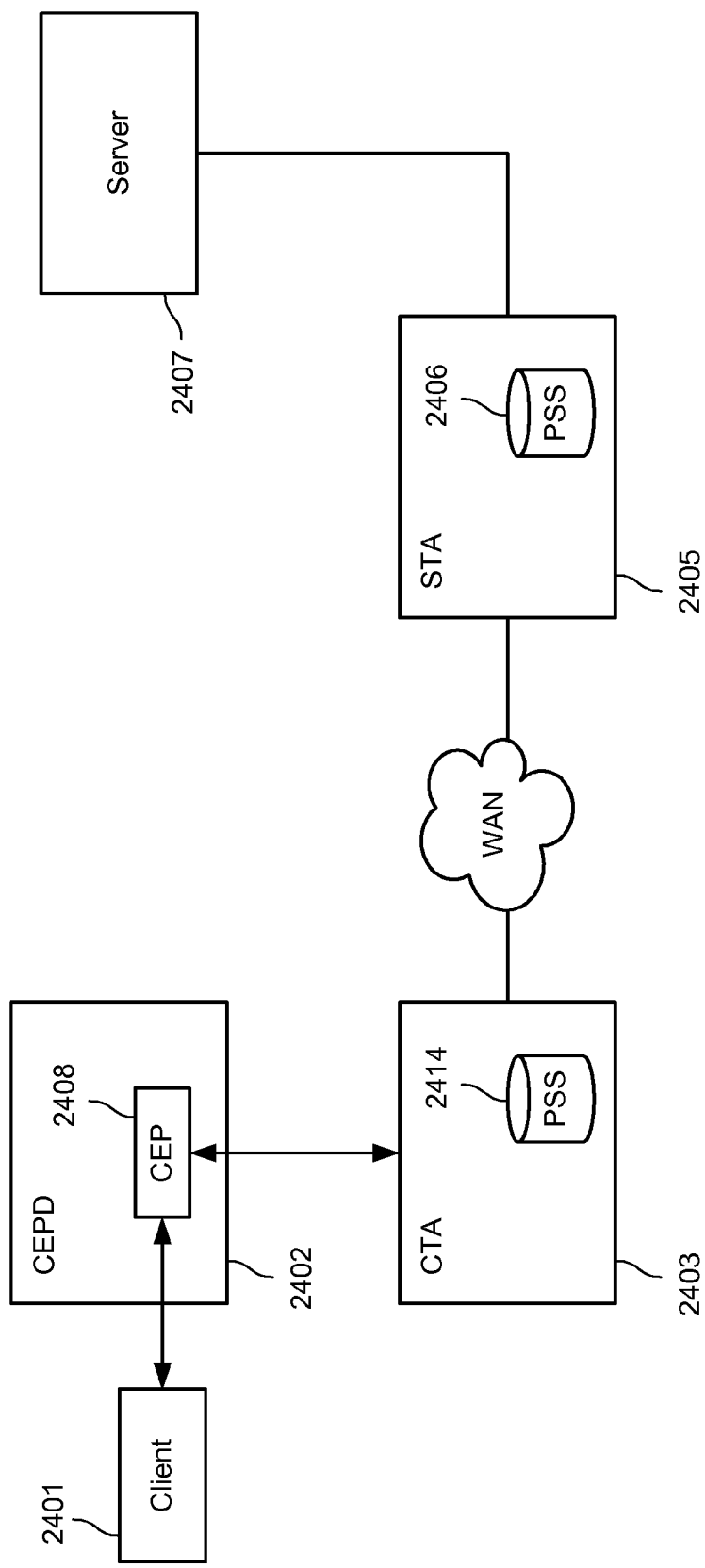
FIG. 24 illustrates one embodiment of an integrated CEPD and client-side transaction accelerator (CTA).

FIG. 24 illustrates this. A client-side transaction accelerator (CTA) 2403 with a persistent segment store (PSS) 2414 is situated near the clients while a server-side transaction accelerator (STA) 2405 with a PSS 2406 is situated near a server. Interposed between CTA 2403 and STA 2405 is a WAN. In addition, a CEPD 2402 is interposed between clients and CTA 2403. A CEP 2408 terminates the transport connection from client 1001 to server 1007 and attempts to open a new connection from CEPD 2402 to server 2407. When CEP 2408 initiates a connection to server 2407, the CTA and STA intercept the connection in some manner such as, for example, as described in McCanne IV.

Given this configuration, CEP 2408 is in a position to effect content delivery of desired data by injecting synthetic protocol messages into the client-server session that cause the server to transmit the desired data toward the client. CEP 2408 in turn discards the resultant data knowing that the segments comprising the data are now all present in PSS 2414 and PSS 2406. When client 2401 later attempts to retrieve the corresponding data from server 2407, that data need not be resent over the network as the CTA/STA pair work together to collapse the requested data, such as is described in McCanne I.

Unlike e-mail, where messages are delivered to specific users, other protocols involve data access patterns incurred by users in an ad hoc fashion. For example, in a file access protocol such as CIFS, a user can access a multitude of different files, created by different users, and stored on different servers. Likewise, a user browsing the Web (either a private enterprise Web or the Internet in general) can end up accessing data from almost anywhere in the world. To deal with this, user affinities for data objects such as Web pages or files can be inferred by the CEP.

One approach to inference is to use the transaction prediction framework described in McCanne III. Another approach is to collect user affinity information in a database and use this database to drive the CEP content delivery algorithm.

In one embodiment, each CEP in a device maintains a user-affinity database (UADB). The UADB contains a set of records that record accesses to data objects. Each record includes a user identifier (e.g., a login name), an object identifier (e.g., a file server and path name, or a Web URL), a timestamp of first access, a timestamp of most recent access, a count and possibly other fields. The record may contain other protocol- or application-specific information that may be used in different ways by different content delivery policies and/or algorithms. For example, the record format for file access protocols might also include the "last modified time" of the object in question.

Each time a data object is accessed by the client through the CEP, the CEP looks up the object record in the UADB. If the object record does not exist, a new record is created for that user and object and entered into the UADB with the timestamps set to the current time and the count initialized to 1. If the record already exists, the count is incremented and the last access time is updated.

Given the UADB, the CEP performs content delivery as a background process, e.g., at night, during times of idle network activity, continually at some configured bit-rate, etc. This can either be done over a session maintained by the CEP after the client terminated the connection or the CEP can login in (establish the connection) if the CEP has clearance to initiate its own connections.

This background delivery process is implemented by having the CEP scan the UADB for all records matching the user being handled by said CEP in a round-robin fashion. For each record, the object is retrieved from the server and simply discarded by the CEP, thus populating the PSS in the local CTA with all of the segment data that represents the desired object. This step can be optimized by additionally keeping a modification timestamp for the object in question (as described above) and only fetching the data object if the modification time on the server is more recent than the last modification time stored in the object record. This scheme is particularly efficient because similar data that happens to be pulled multiple times (e.g., two files with the same data) traverse the WAN only once due to efficient properties the segmentation algorithms described in McCanne I and McCanne II.

Various policies can be used to control how often data objects are scanned and, if necessary, pulled across the network. For example, more frequently accessed objects can be scanned more often than less frequently accessed objects. Or, more recently accessed objects can be scanned more often than less recently accessed objects. Or, objects not accessed for some configurable amount of time can simply be discarded from the UADB.

Figure 25:
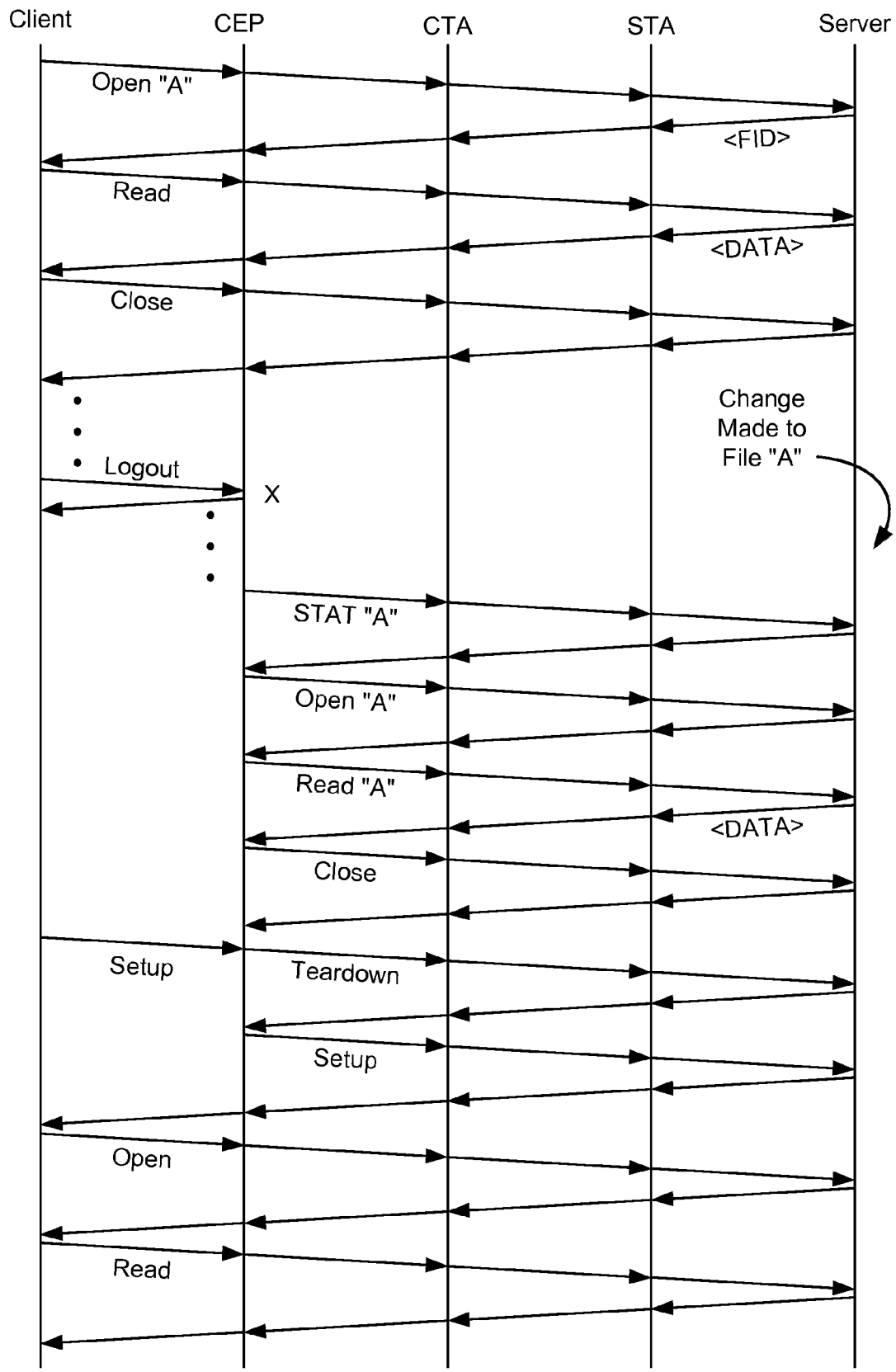
FIG. 25 is a swim diagram of a client-server interaction with an interposing CEP, with a file access protocol such as CIFS.

FIG. 25 illustrates a swim diagram of a client-server interaction with an interposing CEP, assuming a file access protocol like CIFS. In this example, the CEP includes a UADB (not shown) that records the file access patterns. It is assumed that the client has already established a CIFS session with the CIFS server.

At the top of the diagram, the client opens a file "A", then reads data from file "A", and closes it. As these client-server transactions flow through the CEP, the CEP records an object record in the UADB noting that the user has accessed file "A". Some time later, the client logs out and the session is terminated, though as mentioned above, the CEP maintains the session with the server on behalf of the disconnected client to effect content delivery. Some additional time later, a change is made to the file "A", e.g., by some other user who has write permissions for that file. All the time the background content delivery process is running within the CEP occasionally checking the modification time of file "A" as shown in the diagram by sending a "stat" message to the server for file "A". At some point, the CEP notes that the modification time for file "A" is more recent than the modification time stored in the UADB object record. As a consequence, the CEP opens file "A", reads its contents, and simply discards the resulting since all the segments that represent the data contained in file "A" have now successfully been replicated into the PSS in the local CTA. In turn, the client establishes a new CIFS session with the server and access file "A". The CTA then tears down the old CIFS session and allows the new CIFS session to be established.

Alternatively, an agent in the STA could perform the work that tears down the old session and allows the new session through. The advantage of this server-side approach is that users accessing the e-mail service from multiple locations over time will not leave behind a trail of active content-delivery sessions even though there is only one client active at a time. As all the necessary segments are present in the CTA, high performance is thus attained for retrieving file "A" across the WAN.

Some advantages of using CEPs in combination with transaction accelerators and segmentation compared are apparent in the example of an e-mail being sent to a large number of recipients. In that case, suppose a certain message is sent to many recipients. Then, even though each of the many instances of a CEP pulls down a separate copy of the e-mail data, that data is transmitted across the WAN just once to each location by the CTA/STA pair. Even each CEP acts independently of one another and does not do anything to coordinate the efficient delivery of data, only one copy of the e-mail is transmitted to any given location. Moreover, the approach integrates easily with existing infrastructure, requiring no changes or additions to existing clients, servers, or applications.

Figure 26:
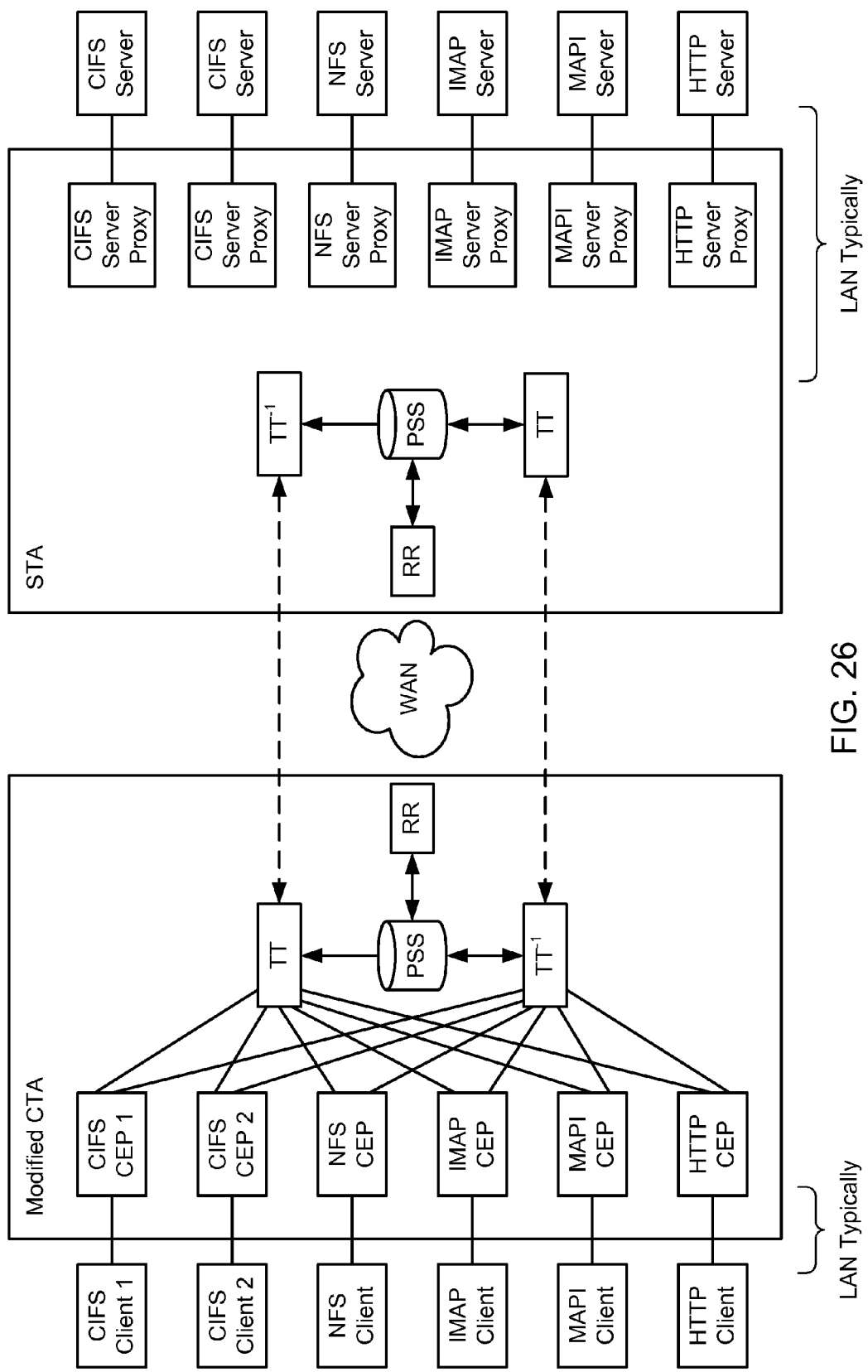
FIG. 26 is an illustration of portions of a content delivery system including protocol-specific and/or protocol-aware CEPs.

As is evident in the discussion of CEP content delivery for CIFS and e-mail, protocol-specific knowledge within the CEP is typically required to interpret and inject synthetic messages into the client-server session to desired data transfers. In some embodiments, protocol-specific knowledge is embedded in multiple types of CEPs that are co-resident within a CTA to create a "modified CTA". This configuration is illustrated in FIG. 26, which shows a number of clients communicating through the modified CTA. Each client communicates with an instance of protocol-specific CEP and there may be more than once instance of each such CEP.

For example, a CIFS client communicates with e a CIFS CEP and a MAP client communicates with a MAPI CEP. As described in McCanne I, each of these CEPs can act as a client proxy that in turn communicates with the transaction transformation modules (TT and $TT^{-1}$) that leverage the PSS to reduce bandwidth consumption over the WAN. Each CEP logically communicates with a server side proxy on the STA, which in turn communicates with the origin server thereby connecting the client to the target server. For example, the CIFS CEP communicates with a CIFS server proxy, which in turn, communicates with the target CIFS server.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

The present invention has many applications, as will be apparent after reading this disclosure. In describing an embodiment of a content delivery system according to the present invention, only a few of the possible variations are described. Other applications and variations will be apparent to one of ordinary skill in the art, so the invention should not be construed as narrowly as the examples, but rather in accordance with the appended claims.

What is claimed is:

1. In a network supporting transactions between clients that request transactions and servers that issue responses responsive to client requests, wherein packets between a client and a server travel over a network path comprising one or more hops between network nodes, a method of probing for proxies on a network path comprising:

receiving, at a first probe node in the network path, a first packet from a target client directed at a target server;

modifying the first packet to signal presence of the first probe node in the network path, thus forming a modified first packet;

forwarding the modified first packet toward the target server;

monitoring, at the first probe node, packets for the target client apparently from the target server to detect packets containing return signals, wherein a return signal is a signal from a proxy that detects the signal in the modified first packet and is an indication that the proxy detected the signal as being a proxy probing signal;

acting on a successful probe if a responsive return signal is received corresponding to a signal sent from the first probe node; and updating a proxy mapping table with results of a successful probe; and following a current connection, using the updated proxy mapping from the proxy mapping table in a later connection.

2. The method of claim 1, wherein acting on comprises recording the successful probe or otherwise altering a state of the first probe node.

3. The method of claim 1, wherein modifying the first packet comprises adding an optional field to the first packet.

4. The method of claim 1, wherein the return signal is an added optional field in a return packet.

5. The method of claim 1, further comprising:
following a successful probe, intercepting client-server communications;
instantiating a connection between the proxy that sent the return signal, being a server-side proxy, and a client-side proxy at the first probe node;
terminating client connections at the client-side proxy;
terminating server connections at the server-side proxy; and
transforming client-server traffic according to a protocol conversion.

6. The method of claim 5, wherein the protocol conversion is a segment cloning conversion.

7. The method of claim 1, further comprising using the proxy mapping table to transform and untransform data using segment cloning.

8. In a network supporting transactions, a transaction being one or more messages wherein the transaction is initiated by a client and a transaction response is provided by a server, and the network further supporting proxies that are interposable in a network path between at least one client and at least one server, wherein a pair of proxies can modify a packet stream between a client and a server such that packet data from the server to the client is transformed at the server-side proxy and untransformed at the client-side proxy, a method for a discovering proxy to transparently discover its position in a proxy pair, if any, the method comprising:
when receiving a first packet of a first transaction from a client at the discovering proxy, determining whether a proxy signal is present in the first packet;
if the proxy signal is not present in the first packet, storing an indication that the discovering proxy is a client-side proxy for the first transaction;
if the proxy signal is not present in the first packet, forwarding a modified first packet toward the server, wherein the modified first packet contains a proxy signal signaling that the discovering proxy is the client-side proxy for the first transaction;
if the proxy signal is present in the first packet when received by the discovering proxy, evaluating the proxy symbol to determine the client-side proxy for the first transaction from the first packet, thereby discovering at least one proxy pair between that client-side proxy and the discovering proxy; and
using the discovered proxy pairs in subsequent transactions.

9. The method of claim 8, further comprising using the proxy pair to transform and untransform data using segment cloning.

* * * * *